United States Patent
Lee et al.

(10) Patent No.: US 10,320,786 B2
(45) Date of Patent: Jun. 11, 2019

(54) ELECTRONIC APPARATUS AND METHOD FOR CONTROLLING THE SAME

(71) Applicant: SAMSUNG ELECTRONICS CO., LTD., Suwon-si, Gyeonggi-do (KR)

(72) Inventors: Jung-kyuen Lee, Seongnam-si (KR); In-ho Kim, Yongin-si (KR); In-hwan We, Suwon-si (KR); Jong-tak Lee, Suwon-si (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 137 days.

(21) Appl. No.: 15/257,000

(22) Filed: Sep. 6, 2016

(65) Prior Publication Data
US 2017/0078287 A1    Mar. 16, 2017

(30) Foreign Application Priority Data

Sep. 14, 2015 (KR) .................. 10-2015-0129840
Jun. 10, 2016 (KR) .................. 10-2016-0072559

(51) Int. Cl.
*H04L 29/06* (2006.01)
*H04W 12/04* (2009.01)
(Continued)

(52) U.S. Cl.
CPC .......... *H04L 63/0876* (2013.01); *G06F 21/74* (2013.01); *H04W 12/04* (2013.01);
(Continued)

(58) Field of Classification Search
CPC ... H04L 63/0876; H04L 67/025; H04L 63/06; H04L 12/58; G06F 21/74; G06F 21/60;
(Continued)

(56) References Cited

U.S. PATENT DOCUMENTS

| 8,375,221 B1 | 2/2013 | Thom et al. |
| 9,021,585 B1 | 4/2015 | Paczkowski et al. |

(Continued)

FOREIGN PATENT DOCUMENTS

| CN | 104202343 | 12/2014 |
| EP | 3 188 445 A1 | 7/2017 |

(Continued)

OTHER PUBLICATIONS

Howard Williams, "Comprehensive Security for Internet-of-Things Devices With ARM® TrustZone®", ARM TechCon, 2014, 25 pages.

(Continued)

*Primary Examiner* — Thanhnga B Truong
(74) *Attorney, Agent, or Firm* — Nixon & Vanderhye P.C.

(57) ABSTRACT

Provided are an electronic apparatus in which a normal operating system (OS) and a secure OS are installed and a method for controlling the electronic apparatus. The method for controlling the electronic apparatus includes searching for at least one external terminal in which a secure OS is installed, selecting a first terminal from among the at least one external terminal in which a secure OS is installed, in response to a first terminal being selected from the retrieved at least one external terminal, performing communication connection with the first terminal, searching for at least one terminal in which only a normal OS is installed, from among at least one external terminal that is capable of being communication-connected to the first terminal, and performing communication with a second terminal of the at least one terminal in which only the normal OS is installed, through the first terminal.

19 Claims, 26 Drawing Sheets

(51) Int. Cl.
*G06F 21/74* (2013.01)
*H04W 4/70* (2018.01)
*H04L 29/08* (2006.01)
*H04W 4/00* (2018.01)
*H04W 12/06* (2009.01)

(52) U.S. Cl.
CPC ............ *H04L 63/06* (2013.01); *H04L 67/025* (2013.01); *H04W 4/005* (2013.01); *H04W 4/70* (2018.02); *H04W 12/06* (2013.01)

(58) Field of Classification Search
CPC ......... G06F 21/33; H04W 12/04; H04W 4/70; H04W 12/06
USPC .............................................. 726/7; 709/206
See application file for complete search history.

(56) References Cited

U.S. PATENT DOCUMENTS

| | | | | |
|---|---|---|---|---|
| 9,712,486 | B2* | 7/2017 | Johnson | .................. H04W 4/70 |
| 9,716,595 | B1* | 7/2017 | Kravitz | ................. H04L 9/3268 |
| 2013/0080782 | A1 | 3/2013 | Rajadurai et al. | |
| 2014/0244768 | A1* | 8/2014 | Shuman | .................. H04W 4/70 |
| | | | | 709/206 |
| 2014/0244997 | A1 | 8/2014 | Goel et al. | |
| 2014/0281560 | A1 | 9/2014 | Ignatchenko et al. | |
| 2015/0007273 | A1 | 1/2015 | Lin | |
| 2015/0019342 | A1 | 1/2015 | Gupta | |
| 2015/0089246 | A1 | 3/2015 | Kanai et al. | |
| 2015/0150127 | A1 | 5/2015 | Ning et al. | |
| 2016/0277933 | A1 | 9/2016 | Moon | |
| 2017/0193242 | A1* | 7/2017 | Luo | ....................... G06F 21/606 |

FOREIGN PATENT DOCUMENTS

| | | |
|---|---|---|
| KR | 10-2013-0080804 | 7/2013 |
| KR | 10-2013-0097388 | 9/2013 |
| KR | 10-1391729 | 5/2014 |
| KR | 10-2014-0112399 | 9/2014 |
| KR | 10-2014-0136400 | 11/2014 |
| KR | 10-2015-0035971 | 4/2015 |
| KR | 10-1516217 | 5/2015 |
| KR | 10-1521616 | 5/2015 |
| KR | 10-2015-0059564 | 6/2015 |
| WO | WO 2008/082441 | 7/2008 |
| WO | WO 2014/038926 | 3/2014 |

OTHER PUBLICATIONS

[Online], Warren Kurisu, "Securing IoT Devices With Arm TrustZone", Jun. 15, 2014, 3 pages.
Search Report and Written Opinion dated Dec. 12, 2016 in counterpart International Patent Application No. PCT/KR2016/010183.
EP Search Report dated Mar. 9, 2018 for EP Application No. 16846818.9.
European Office Action dated Nov. 5, 2018 for EP Application No. 16846818.9.

* cited by examiner

ELECTRONIC APPARATUS AND METHOD FOR CONTROLLING THE SAME

CROSS-REFERENCE TO RELATED APPLICATION

This application is based on and claims priority under 35 U.S.C. § 119 to Korean Patent Application No. 10-2015-0129840, filed on Sep. 14, 2015, and Korean Patent Application No. 10-2016-0072559, filed on Jun. 10, 2016, in the Korean Intellectual Property Office, the disclosure of which is incorporated by reference herein in its entirety.

BACKGROUND

Field

Apparatuses and methods of the disclosure relate generally to an electronic apparatus and a method for controlling the same, and for example, to an electronic apparatus and a method for controlling the same, for performing security communication using a secure operating system (OS) by an electronic apparatus in which a normal OS and a secure OS are installed.

Description of Related Art

Recently, by virtue of the development of communication technologies, Internet of things (IoT) technologies for connecting daily objects through wired and wireless networks to share information and providing a specific service has been developed.

According to the typical IoT technology, technologies of various electronic apparatuses are integrated to constitute a specific service. Accordingly, there is a possibility of security vulnerability due to security vulnerability of each electronic apparatus or integration of a plurality of electronic apparatuses.

Accordingly, there is a need for a method for preventing hacking and enhancing communication security during an IoT service using various electronic apparatuses.

SUMMARY

Example embodiments of the disclosure address the above disadvantages and other disadvantages not described above.

The disclosure provides an electronic apparatus and a method for controlling the same, for enhancing security of an Internet of things (IoT) service using a secure operating system (OS).

According to an example aspect of the disclosure, a method for controlling an electronic apparatus in which a normal operating system (OS) and a secure OS are installed includes: searching for and retrieving at least one external terminal in which a secure OS is installed; selecting a first terminal from among the retrieved at least one external terminal in which a secure OS is installed; performing communication connection between the electronic apparatus and the first terminal; in response to selection of the first terminal, performing communication connection between the electronic apparatus and the first terminal; searching for and retrieving at least one external terminal in which only a normal OS is installed, from among the at least one external terminal that is capable of being communication-connected to the first terminal; selecting a second terminal from the retrieved at least one external terminal in which only a normal OS is installed and that is capable of being communication-connected to the first terminal; and performing communication between the electronic apparatus and a second terminal of the at least one terminal in which only the normal OS is installed, through the first terminal.

The method may further include grouping the at least one terminal in which only the normal OS is installed, based on a user selection.

The searching for the at least one terminal in which only the normal OS is installed may include receiving information about the at least one terminal in which only the normal OS is, from the first terminal, and displaying a UI based on information about the at least one terminal in which only the normal OS is installed, and the performing communication between the electronic apparatus and the second terminal may include performing communication with the second terminal selected from among electronic apparatuses included in the UI.

The method may further include, after communication connection between the electronic apparatus and the first terminal is performed, generating a first key value in the secure OS; transmitting the first key value to the first terminal; receiving a second key value from the first terminal; and maintaining communication connection between the electronic apparatus and the first terminal using the first key value and the second key value.

The method may further include blocking communication connection between the electronic apparatus and the first terminal when at least one of the first key value and the second key value is not present.

The first key value and the second key value may be updated at a preset period.

The method may further include, in response to a command for performing an Internet of things (IoT) service being input, generating a control command using the second key value in the secure OS and transmitting the control command generated based on the second key value to the first terminal, wherein the first terminal is configured to decode the generated control command based on the second key value in the secure OS and to perform the IoT service.

The method may further include, after communication connection between the electronic apparatus and the second terminal is performed, generating a third key value in the secure OS and transmitting the third key value to the second terminal, wherein, in response to a control command being received by the second terminal from the electronic apparatus in order to perform the IoT service, the second terminal is configured to authenticate the electronic apparatus using the third key value.

The method may further include, in response to a third terminal being selected via the UI from the at least one terminal in which only the normal OS included, displaying a control menu for controlling the third terminal.

According to another example of the disclosure, a electronic apparatus includes communication circuitry configured to communicate with an external terminal, and a processor configured to drive one of a normal operating system (OS) and a secure OS to perform an operation of the electronic apparatus, wherein the processor is configured to search for and retrieve at least one external terminal in which a secure OS is installed, to select a first terminal from among the retrieved at least one external terminal in which a secure OS is installed, to control the communication circuitry to perform communication connection between the electronic apparatus and the first terminal, the processor further configured to search for and retrieve at least one external terminal in which only a normal OS is installed and which is capable of being communication-connected to the first terminal, to select a second terminal from the retrieved at least one terminal in which only a normal OS is installed and that is capable of being communication-connected to the first terminal, and to perform communication between the electronic apparatus and a second terminal of the at least one terminal in which only the normal OS is installed, through the first terminal.

The processor may be configured to group the at least one terminal in which only the normal OS is installed, based on a user selection.

The electronic apparatus may further include a display, wherein the processor may be configured to control the communication circuitry to receive information about at least one terminal in which the secure OS is not installed, from the first terminal, to control the display to display a UI based on information about the at least one terminal in which only the normal OS is installed, and to control the communication circuitry to perform communication between the electronic apparatus and the second terminal selected from among electronic apparatuses included in the UI.

The processor may be configured to to generate a first key value in the secure OS, to control the communication circuitry to transmit the first key value to the first terminal, and to receive a second key value from the first terminal, after communication connection between the electronic apparatus and the first terminal is performed, and to control the communication circuitry to maintain communication connection between the electronic apparatus and the first terminal using the first key value and the second key value.

When at least one of the first key value and the second key value is not present, the processor may be configured to control the communication circuitry to block communication connection with the first terminal.

The first key value and the second key value may be updated at a preset period.

In response to a command for performing an Internet of things (IoT) service being input, the processor may be configured to generate a control command using the second key value in the secure OS, to control the communication circuitry to transmit a control command generated based on the second key value to the first terminal, and the first terminal may be configured to decode the generated control command based on the second key value in the secure OS and to perform the IoT service.

After communication connection with the second terminal is performed, the processor may be configured to generate a third key value in the secure OS, to control the communication circuitry to transmit the third key value to the second terminal, and in response to a control command being received from the electronic apparatus to perform the IoT service, the second terminal may be configured to authenticate the electronic apparatus using the third key value.

In response to a third terminal being selected from the at least one terminal in which only the normal OS included in the UI is installed, the processor may be configured to control the display to display a control menu for controlling the third terminal.

According to another example of the disclosure, a computer readable recording medium having recorded thereon a program which, when executed, operates to control a electronic apparatus in which a normal operating system (OS) and a secure OS are installed, the operation including searching for a first terminal, said first terminal being at least one external terminal in which a secure OS is installed; in response to a first terminal being selected from the retrieved at least one external terminal, performing communication connection between the electronic apparatus and the first terminal, searching for a second terminal, said second terminal being at least one terminal in which only a normal OS is installed and being, capable of being communication-connected to the first terminal, and performing communication between the electronic apparatus and a second terminal of the at least one terminal in which only the normal OS is installed, through the first terminal.

According to the various example embodiments of the disclosure, communication may be performed with an external terminal using a secure OS, and thus access from outside a security network may be difficult and/or impossible, thereby enhancing communication security between IoT terminals.

In addition, security communication with a terminal in which a secure OS is not installed and only a normal OS is installed may also be possible.

Additional and/or other aspects and advantages of the disclosure will be set forth in part in the detailed description which follows and, in part, will be apparent from the detailed description.

BRIEF DESCRIPTION OF THE DRAWINGS

The above and/or other aspects of the disclosure will be more apparent from the following detailed description, taken in conjunction with the accompanying drawings, in which like reference numerals refer to like elements, and wherein.

DETAILED DESCRIPTION

Figure 1:
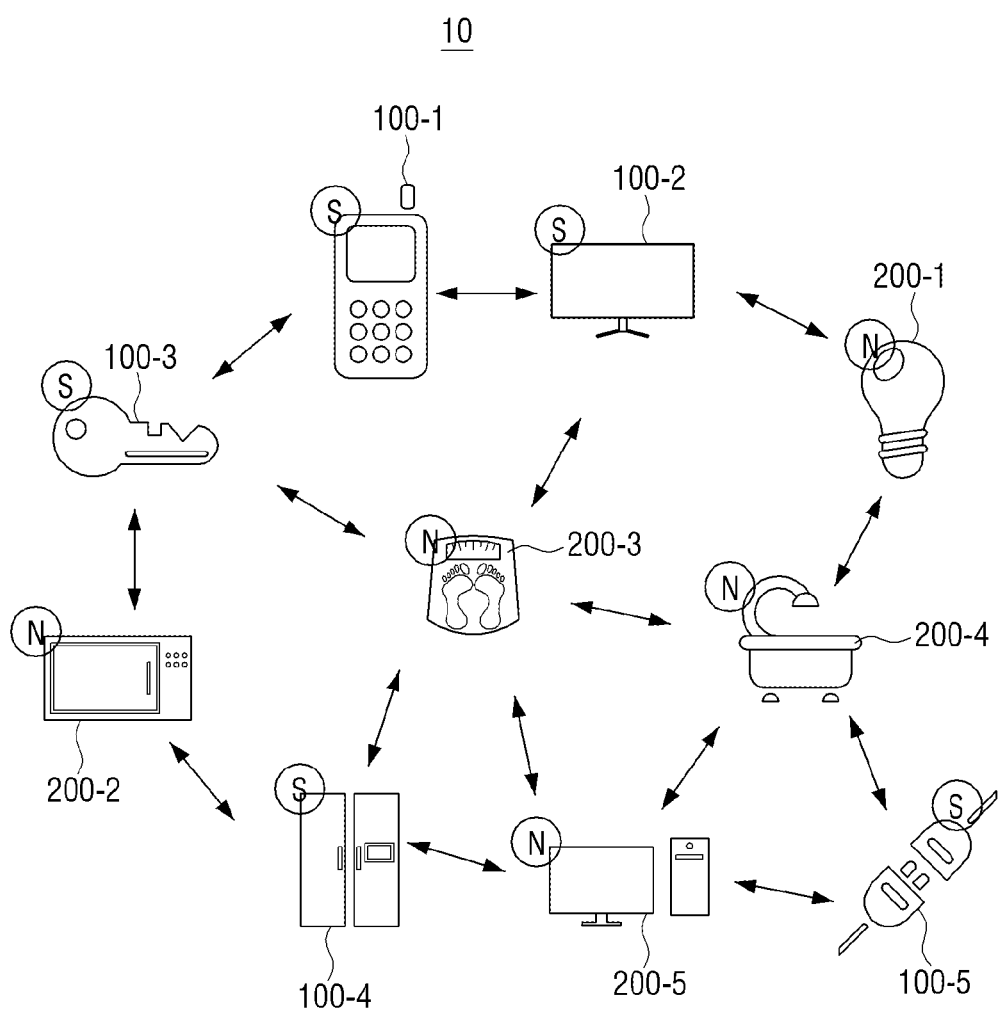
FIG. 1 is a schematic diagram illustrating an example security network system.

The terms used in the disclosure will be schematically described and then example embodiments of the disclosure will be described in greater detail.

The terms used herein are general terms that have been widely used in the technical art to which the disclosure pertains. However, some of the terms used herein may be created reflecting intentions of technicians in this art, precedents, or new technologies. Also, some of the terms used herein may be arbitrarily chosen. In this case, these terms are defined in detail below. Accordingly, the specific terms used herein should be understood based on the unique meanings thereof and the whole context of the disclosure.

As the disclosure allows for various changes and numerous example embodiments, particular example embodiments will be illustrated in the drawings and described in greater detail in the following disclosure. However, this is not intended to limit the disclosure to particular modes of practice, and it is to be appreciated that all changes, equivalents, and substitutes that do not depart from the spirit and technical scope of the disclosure are encompassed in the disclosure. In the detailed description, certain detailed explanations of related art may be omitted when it is deemed that they may unnecessarily obscure the essence of the disclosure.

The terms such as "first" and "second" are used herein merely to describe a variety of constituent elements, but the constituent elements are not limited by the terms. The terms are used only for the purpose of distinguishing one constituent element from another constituent element.

The singular expressions in the disclosure include the plural expressions unless clearly specified otherwise in context. Also, the terms such as "include" or "comprise" may be construed to denote a certain characteristic, number, step, operation, constituent element, or a combination thereof, but may not be construed to exclude the existence of or a possibility of addition of one or more other characteristics, numbers, steps, operations, constituent elements, or combinations thereof.

The terms, such as 'unit' or 'module', etc., should be understood as a unit that processes at least one function or operation and that may be embodied in a hardware manner (e.g., circuitry), a software manner, or a combination of the hardware manner and the software manner. In addition, a plurality of 'modules' or a plurality of 'units' may be integrated into at least one module to be embodied as at least one processor except for a 'module' or a 'unit' that needs to be embodied as a specific hardware.

In the disclosure, when it is described that a certain part is "connected" to another part, it should be understood that the certain part may be directly connected to another part or electrically connected to another part via another part in the middle. In addition, when a certain part "includes" a certain component, this indicates that the part may further include another component instead of excluding another component unless there is no different disclosure.

In the following detailed description, only certain example embodiments of the disclosure are illustrated and described, simply by way of illustration. As those skilled in the art would realize, the described example embodiments may be modified in various different ways, all without departing from the spirit or scope of the disclosure. Accordingly, the drawings and description are to be regarded as illustrative in nature and not restrictive. Like reference numerals designate like elements throughout the specification.

In addition, in the example embodiments of the disclosure, the term "application" may, for example, refer to a series of computer program sets that are created for performing a specific task. In the example embodiments, there may be various applications. Examples of the application may include, for example, a game application, a video reproducing application, a map application, a memo application, a calendar application, a phone book application, broadcast application, an exercise support application, a payment application, a picture folder application, and so on, without being limited thereto.

Further, in the present disclosure, a user interaction (UI) element is a graphic object capable of interacting with a user, and refers to a graphic object capable of receiving a user input or providing at least one of visual feedback, auditory feedback, tactile feedback and olfactory feedback according to the user input.

FIG. 1 is a schematic diagram illustrating an example security network system 10. The security network system 10 may include a plurality of electronic apparatuses 100 (hereinafter, referred to as an "S node") in which a normal operating system (OS) and a secure OS are installed and a plurality of electronic apparatuses 200 (hereinafter, referred to as an "N node") in which only a normal OS is installed. In this example, a plurality of S nodes and a plurality of N nodes may each be an electronic apparatus for providing an IoT service. According to an example embodiment, a first S node 100-1 may, for example, be a smart phone, a second S node 100-2 may, for example, be a smart television (TV), a third S node 100-3 may, for example, be front door apparatus, a fourth S node 100-4 may, for example, be a refrigerator, and a fifth S node 100-5 may, for example, be an electrical outlet apparatus. A first N node 200-1 may, for example, be an illuminance apparatus, a second N node 200-2 may, for example, be embodied as a microwave, a third N node 200-3 may, for example, be embodied as an electronic scale, a fourth N node 200-4 may, for example, be embodied as a bath apparatus, and a fifth N node 200-5 may, for example, be embodied as a desktop personal computer (PC). The S node and N node illustrated in FIG. 1 may be classified based on whether a secure OS is installed rather than being classified based on apparatus characteristic and may be embodied as other apparatuses.

A normal OS may be a common OS such as, for example, Android, Window Phone, and Symbian. A secure OS may be a security kernel with an enhanced security function compared with the normal OS and may be installed together with the normal OS in an electronic apparatus.

For example, a processor included in the S node 100 may be selectively operated as one of a normal domain in which a normal OS is driven and operated and a secure domain in which a secure OS is driven and operated. The secure domain may, for example, refer to a data processing architecture with ensured security and the normal domain may, for example, refer to a general data processing architecture.

For example, the S node 100 may use "ARM trustzone architecture". The runtime-architecture divided into two parts available from the ARM company for a microprocessor system is known as the "ARM trustzone architecture". The runtime-architecture may include two runtime environments. A non-security runtime environment as one of the runtime environments may be referred to as a "normal zone" or a "normal world" or a "normal domain". The non-security runtime environment may be controlled by a normal OS. A security runtime environment as the other one may be referred to as a "trustzone", a "trusted world" or a "secure world" or a "secure domain". The security runtime environment may be controlled by a secure OS.

For example, the S node 100 may perform/maintain communication connection with another S node in the secure OS and perform an IoT service. For example, the S node 100 may perform the IoT service in a secure world.

For example, in response to a user command for S node search being input to the first S node 100-1, the first S node 100-1 may retrieve a plurality of S nodes 100-2 to 100-4 in which a secure OS is installed, from among the external terminals.

In response to one being selected from the plurality of S nodes 100-2 to 100-4, the first S node 100-1 may connect and be in communication with the selected S node. In addition, the first S node 100-1 may generate a first key value in the secure OS and transmit the generated first key value to the selected S node. In addition, the selected S node may also generate a second key value in the secure OS and transmit the generated second key value to the first S node 100-1.

The first S node 100-1 and the selected S node may maintain a communication connection using the first key value and the second key value. In this example, both of the first S node 100-1 and the selected S node may perform communication connection in the secure world. In addition, when at least one of the first key value and the second key value is not present, the first S node 100-1 and the selected S node may block communication.

In addition, the first S node 100-1 and the selected S node may provide an IoT service in the secure OS using the first key value and the second key value. For example, the first S node 100-1 may generate a control command using at least one of the first key value and the second key value in the secure OS in response to a user command for performing the IoT service and transmit the generated control command to the selected S node. In addition, the selected S node may authenticate the first S node or decode the control command to provide the IoT service based on at least one of the first key value and the second key value in the secure OS.

The first S node 100-1 may perform communication connection with the plurality of N nodes 200-1 to 200-5 in the secure OS and perform the IoT service. For example, after performing communication connection with the selected N node, the first S node 100-1 may generate the first key value in the secure OS, and transmit the first key value to the selected N node. The selected N node may store the first key value.

In response to a user command for performing the IoT service being input to the first S node 100-1, the first S node 100-1 may generate a control command using the first key value in the secure OS and transmit the generated control command to the selected N node.

The selected N node may authenticate the first S node 100-1 or decode the control command using the first key value and perform an IoT service.

The first S node 100-1 may communicate with at least one of the plurality of N nodes 200-1 and 200-3 through the second S node 100-2 that is capable of performing secure communication. For example, the first S node 100-1 may perform secure communication with the second S node 100-2 using a secure OS.

In addition, the first S node 100-1 may retrieve the N nodes 200-1 and 200-3 connectable to the second S node 100-2. For example, the first S node 100-1 may request information about an N node that is capable of being communication-connected to the second S node 100-2, from the second S node 100-2. In response to information being received from the second S node 100-2, the first S node 100-1 may provide the N nodes 200-1 and 200-3 connectable to the second S node 100-2 to a user and connect to perform communication with one of the N nodes 200-1 and 200-3 connectable to the second S node 100-2 based on user selection. In this example, the first S node 100-1 may perform secure communication with the selected N node through the second S node 100-2. In addition, the first S node 100-1 may transmit a control command for performing an IoT service to a selected N node through the second S node 100-2.

According to the aforementioned security network system 10, a user may be served with an IoT service having more enhanced security.

Figure 2:
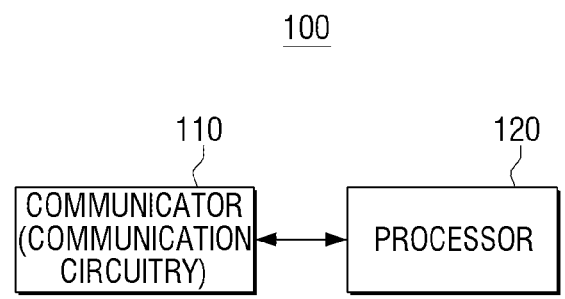
FIG. 2 is a schematic block diagram illustrating an example configuration of a electronic apparatus.

FIG. 2 is a block diagram illustrating an example configuration of an electronic apparatus 100. As illustrated in FIG. 2, the electronic apparatus 100 may include a communicator (e.g., including communication circuitry) 110 and a processor (e.g., including processing circuitry) 120.

In this example, the electronic apparatus 100 may be realized as a smart phone; however, this is merely an example. The electronic apparatus 100 may include at least one of a smartphone, a tablet personal computer, a mobile phone, a video phone, an e-book reader, a desktop PC, a laptop PC, a netbook computer, a workstation, a server, a personal digital assistant (PDA), a portable multimedia player (PMP), an MP3 player, a mobile medical device, a camera, and a wearable device, or the like. According to various example embodiments, a wearable device may include at least one of an accessories type (e.g. watch, ring, bracelet, ankle bracelet, necklace, glasses, contact lens or head-mounted-device (HMD)), a textile or clothing-integral type (e.g. electronic clothes), a body-attachment type (e.g. skin pad or tattoo), and trans-sacral implantable type (e.g. implantable circuit), or the like.

According to some example embodiments, the electronic apparatus may be home appliance. For example, the home appliance may include at least one of a television, a digital video disk (DVD) player, a stereo, a refrigerator, an air conditioner, a cleaner, an oven, a microwave oven, a washing machine, an air purifier, a set-top box, a home automation control panel, a security control panel, a TV box (e.g. Samsung HomeSync co, Apple TVmeS or Google TVeSyn game console (e.g. Xboxncc control panel), an electronic dictionary, an electronic key, a camcorder, and an electronic picture frame), or the like.

According to another example embodiment, the electronic apparatus may include at least one of various medical devices (e.g. various portable medical measuring instruments (glucose meter, heart rate measuring device, blood pressure gauge, thermometer, or etc.), magnetic resonance angiography (MRA), magnetic resonance imaging (MRI), computed tomography (CT) image taking apparatus, ultrasound apparatus, or etc.), a navigation apparatus, a global navigation satellite system (GNSS), an event data recorder (EDR), a flight data recorder (FDR), an automobile infotainment apparatus, avionics, a security device, a head unit for vehicles, a robot for use in industry and household, an automatic teller's machine (ATM) of a financial institution, a point of sales of a store, and an Internet of Things (IoT) device (e.g. light bulb, various sensors, an electronic or gas meter, a sprinkler device, a fire alarm, a thermostat, a streetlight, a toaster, an exercising apparatus, a hot water tank, a heater, a boiler, etc.), or the like.

According to an example embodiment, the electronic apparatus may include at least one of furniture, part of a building/structure, an electronic board, an electronic signature receiving device, a projector, and various measuring apparatuses (e.g. water pipe, electricity, gas, wave measuring apparatus, etc.), or the like.

The communicator 110 may be configured to communicate with an external apparatus. For example, the communicator 110 may perform secure communication with at least one of an S node and an N node.

The processor 120 may be configured to control an overall operation of the electronic apparatus 100. For example, the processor 120 may be configured to selectively drive one of the normal OS and the secure OS to be operated as one of the normal world and the secure world. In this example, when the processor 120 uses a service (e.g., a banking service, a user authentication service, and an IoT service) requiring a security operation, the processor 120 may be configure to drive the secure OS so as to be operated as the secure world.

For example, the processor 120 may be configured to retrieve at least one S node in which a secure OS is installed, in response to a user command, and in response to a first S node being selected from the retrieved at least one S node, the processor 120 may be configured to control the communicator 110 to perform or establish a communication connection with the first S node. In this example, the processor 120 may be configured to control a display to display a UI including the retrieved at least one S node. In addition, the processor 120 may be configured to select a first S node based on the user command input through the UI.

After communication connection is performed, the processor 120 may be configured to generate a first key value in the secure OS and to control the communicator 110 to transmit the first key value, and to receive a second key value from the first S node. In addition, the processor 120 may be configured to maintain communication connection with the first S node using the first key value and the second key value. In this example, the processor 120 may be configured to maintain communication connection with the first S node in the secure world.

In addition, when at least one of the first key value and the second key value is not present, the processor 120 may be configured to control the communicator 110 to block communication connection with the first S node. For example, the first key value and the second key value are key values used to authenticate each other, and when at least one of the first key value and the second key value is not present, processor 120 may be configured to determine that the communication connection is not normal communication connection and block communication connection with the first S node.

The processor 120 may be configured to update a key value required for authentication and to control the communicator 110 to transmit the updated key value to the first S node. In addition, the processor 120 may be configured to receive the updated key value from the first S node and store the updated key value. For example, when communication connection between an electronic apparatus and the first S node is maintained, the processor 120 may be configured to generate a new third key in the secure OS and to control the communicator 110 to transmit the generated third key value to the first S node, and to receive a new fourth key value from the first S node. In addition, the processor 120 may be configure to maintain communication connection with a selected external terminal using the third key value and the fourth key value. In such a manner, the processor 120 may be configured to periodically or aperiodically update a key value and may be configured to maintain communication connection with the first S node.

For example, as described above, the processor 120 may be configured to perform secure communication using key values transmitted and received to and from a network layer of the secure OS.

In addition, in response to a user command for performing an IoT service being input to the processor 120, the processor 120 may be configured to generate a control command using at least one of the first key value and the second key value in the secure OS and to control the communicator 110 to transmit the generated control command to the first S node. In this example, the processor 120 may be configured to generate a control command including at least one of the first key value and the second key value as authentication information and to generate an encrypted control command using at least one of the first key value and the second key value.

The first S node may authenticate the electronic apparatus 100 or decode a control command to perform an IoT service using the control command that is generated based on at least one of the first key value and the second key value in the secure OS.

For example, the processor 120 may be configured to transmit and receive the control command generated using key values in an IoT service layer of the secure OS to perform secure communication.

In addition, the processor 120 may be configured to perform secure communication with N nodes based on the key values generated in the secure OS.

For example, in response to the electronic apparatus 100 being selected from a UI including at least one S node, the processor 120 may be configured to retrieve at least one N node in which only a normal OS is installed from among electronic apparatuses connectable to the electronic apparatus 100, and to control a display to display the retrieved at least one N node on the UI. In addition, in response to the first N node being selected from at least one N node, the processor 120 may be configured to control the communicator 110 to perform communication connection with the first N node.

In addition, after communication connection with the second terminal is performed, the processor 120 may be configured to generate a fifth key value in the secure OS and to control the communicator 110 to to transmit the generated fifth key value to the first N node. The first N node may store the received fifth key value. In this example, the processor 120 may be configured to continuously update key values and to control the communicator 110 to transmit the updated key values.

In addition, in response to a user command for performing an IoT service being input to the processor 120, the processor 120 may be configured to generate a control command using the fifth key value and to control the communicator 110 to transmit the generated control command to the first N node. In response to a control command being input from the electronic apparatus 100 in order to perform an IoT service, the first N node may authenticate the electronic apparatus 100 or decode the control command using the fifth key value to perform an IoT service corresponding to the control command.

Although the electronic apparatus 100 directly communicates with the first N node according to the aforementioned example embodiment, this is merely an embodiment, and thus the electronic apparatus 100 may communicate with the first N node through an S node. For example, when the electronic apparatus 100 communicates with the S node using the secure OS and the S node communicates with the first N node using the secure OS, the electronic apparatus 100 may transmit a control command to the first N node through the S node.

An electronic apparatus will be described in greater detail below with reference to FIGS. 3 to 11.

Figure 3:
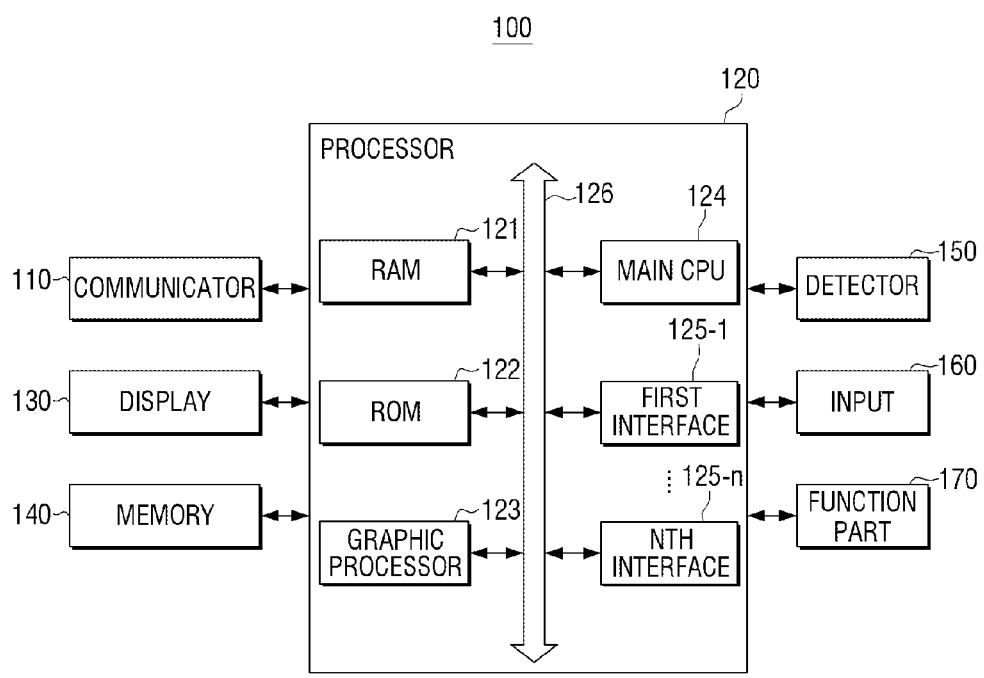
FIG. 3 is a block diagram illustrating an example configuration of a electronic apparatus.

FIG. 3 is a block diagram illustrating an example configuration of the electronic apparatus 100. As illustrated in FIG. 3, the electronic apparatus 100 includes, for example the communicator (e.g., including communication circuitry) 110, a display 130, a memory 140, a detector 150, an input (e.g., including input circuitry) 160, a function part (e.g., including processing circuitry) 170, and the processor 120.

The components of the electronic apparatus 100 illustrated in FIG. 3 are merely an example, and are not limited thereto. Some components of the electronic apparatus 100 illustrated in FIG. 3 may be omitted or modified or other components may be added according to a type of the electronic apparatus 100 or a purpose of the electronic apparatus 100.

The communicator 110 may, for example, be a component (e.g., circuitry) that communicates with various types of external devices via various types of communication methods. The communicator 110 may include various communication circuitry, such as, for example, and without limitation, at least one of a Wi-Fi chip, a Bluetooth chip, a wireless communication chip, and a near field communication (NFC) chip, or the like. The processor 120 may be configured to communicate with an external S node or N node using the communicator 110. In this example, the processor 120 may be configured to drive a secure OS to drive a secure world and to communicate with the S node or the N node in the secure world while an IoT service is performed.

For example, the Wi-Fi chip and the Bluetooth chip may perform communication in a WiFi manner and a Bluetooth manner, respectively. When the Wi-Fi chip or the Bluetooth chip is used, various connection information items such as SSID and session keys may be first transmitted and transmitted, communication may be connected using the various connection information items, and then various information items may be transmitted and received. The wireless communication chip may, for example, refer to a chip that performs communication according to various communication standards such as IEEE, ZigBee, $3^{rd}$ generation (3G), $3^{rd}$ generation partnership project (3GPP), and long term evolution (LTE), or the like. The NFC chip may refer, for example, to a chip that operates using a NFC method using a band of 13.56 MHz among various RF-ID frequency bands such as 135 kHz, 13.56 MHz, 433 MHz, 860 to 960 MHz, and 2.45 GHz.

The display 130 may be configured to display various images in a display region. The various images may include, for example, an application execution image. Various types of contents (e.g., an image, a video, or a text), content, a UI element for controlling the electronic apparatus 100, or the like may be displayed on the display as various images. For example, the display 130 may display a UI for managing the S node and the N node.

The display 130 may, for example, be embodied as a various types of display panels. For example, the display panel may be embodied according to various display technologies such as liquid crystal display (LCD), organic light emitting diodes (OLED), active-matrix organic light-emitting diode (AM-OLED), liquid crystal on silicon (LcoS) or digital light processing (DLP), or the like.

The display 130 may be coupled to at least one of a front region, a lateral region, and a rear region of the electronic apparatus 100 in the form of a flexible display. The flexible display may be bent, twisted, or rolled without being damaged through a thin and flexible substrate such as paper. The flexible display may be manufactured using a plastic substrate as well as a generally used glass substrate. When the plastic substrate is used, the flexible display may be formed using a low-temperature preparation processor instead of a conventional preparation processor in order to prevent a substrate being damaged. In addition, a glass substrate surrounding flexible liquid crystal may be substitute with a plastic film to provide flexibility for folding and unfolding a display. It is advantageous in that the flexible display is thin and lightweight, is also resistant to shocks, and is capable of being manufactured in various forms being twisted or bent.

The display 130 may, for example, be coupled to a touch detector so as to be embodied as a touch screen with a layer structure. The touch screen may have a function of detecting a touch input pressure as well as a touch input position and a touched area in addition to a display function and may also have a function of detecting proximity touch as well as real touch.

The memory 140 may store various programs and data required for an operation of the electronic apparatus 100.

The memory 140 may, for example, be embodied as a non-volatile memory, a volatile memory, a flash memory, a hard disk drive (HDD), a solid state drive (SSD), or the like. The memory 140 may be accessed by the processor 120 and may perform reading/recording/correcting/deleting/updating on data by the processor 120. The term 'memory' as used herein may include, for example, a memory card (not shown) (e.g., a micro SD card and a memory stick) installed in the memory 140, a ROM 122 or an RAM 121 in the processor 120, or the electronic apparatus 100. In addition, the memory 140 may store program, data, or the like for configuring various images to be displayed in a display region of the display 130.

Figure 4A:
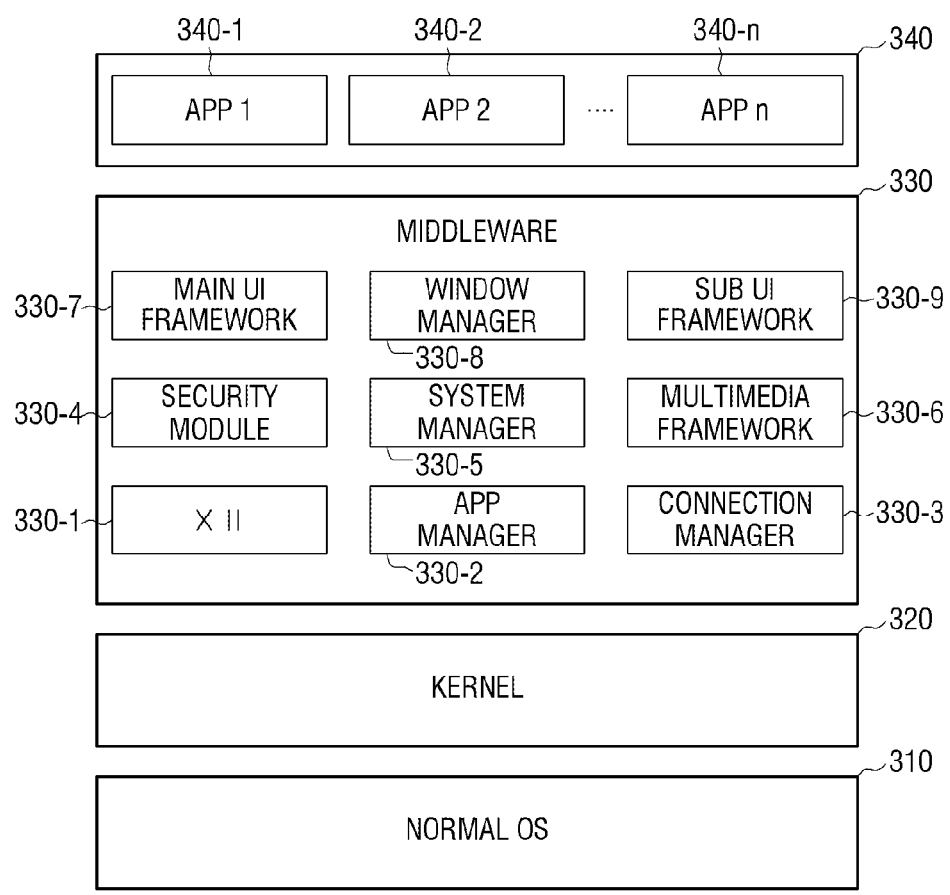
FIGS. 4A and 4B are block diagrams illustrating example configurations of a normal operating system (OS) and a secure OS.
Figure 4B:
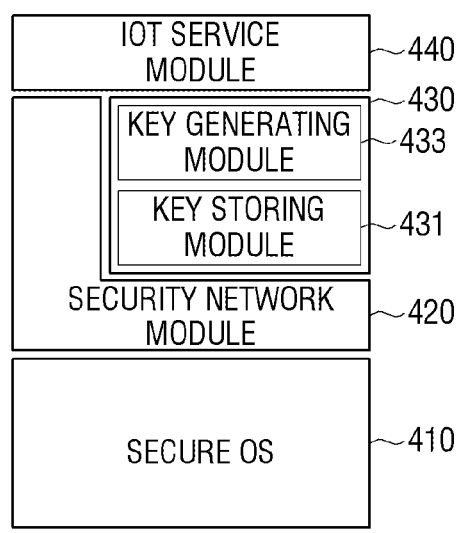

An example configuration of software stored in the memory 140 will be described with reference to FIGS. 4A and 4B. For example, FIG. 4A is a diagram illustrating example software of a normal world using a normal OS. FIG. 4B is a diagram illustrating example software of a secure world using a secure OS.

According to an example embodiment, referring to FIG. 4A, the normal world of the memory 140 may include a normal OS 310, a kernel 320, middleware 330, an application module 340, and so on.

The normal OS 310 may, for example, control and manage an overall operation of hardware. For example, the normal OS 310 may be a layer being responsible for a basic function of hardware management, memory, and security.

The kernel 320 may, for example, function as a path for transferring various signals as well as a touch signal, etc. that may be detected by the detector 150 to the middleware 330.

The middleware 330 may include, for example, various software modules for controlling an operation of the electronic apparatus 100. Referring to FIG. 4A, the middleware 330 may include, f or example, an X11 module 330-1, an APP manager 330-2, a connection manager 330-3, a security module 330-4, a system manager 330-5, a multimedia framework 330-6, a main UI framework 330-7, a window manager 330-8, and a sub UI framework 330-9.

The X11 module 330-1 may receive various event signals from various hardware items included in the electronic apparatus 100. For example, the event may be variously set as an event of touching a user gesture, an event in which system alarm occurs, an event of executing or terminating a specific program, and so on.

The APP manager 330-2 may be a module for managing an execution state of various applications 340 installed in the memory 140. In response to an application execution event being detected from the X11 module 330-1, the APP manager 330-2 may call and execute an application corresponding to a corresponding event.

The connection manager 330-3 may be a module for supporting wired or wireless network connection. The connection manager 330-3 may include various detailed modules such as a DNET module and a UPnP module.

The security module 330-4 may be a module for supporting certification, permission, secure storage, and so on of hardware.

The system manager 330-5 may monitor states of components in the electronic apparatus 100 and provide the monitoring result. For example, when battery remains are insufficient, an error occurs, or a communication connection state is disconnected, the system manager 330-5 may provide the monitoring result to the main UI framework 330-7 or the sub UI framework 330-9 to output a notification message or a notification sound.

The multimedia framework 330-6 may be a module for reproducing multimedia content that is stored in the electronic apparatus 100 or provided from an external source. The multimedia framework 330-6 may include a player module, a camcorder module, a sound processing module, and so on. Accordingly, the multimedia framework 330-6 may perform an operation for reproducing various multimedia contents to generate and reproduce an image and a sound.

The main UI framework 330-7 may be a module for providing various UIs to be displayed in a main region of the display 130. The sub UI framework 330-9 may be a module for providing various UIs to be displayed in a sub region. The main UI framework 330-7 and the sub UI framework 330-9 may each include an image compositor module for composing various objects, a coordinate combination module for calculating a coordinate for displaying various UI elements, a rendering module for rendering the composed object at the calculated coordinate, and a 2D/3D UI tool kit for providing a tool for configuration of a 2D or 3D form of UI.

The window manager 330-8 may detect a touch event or other input events using a user body or a pen. In response to the event being detected, the window manager 330-8 may transmit an event signal to the main UI framework 330-7 or the sub UI framework 330-9 and perform an operation corresponding to the event.

In addition, the window manager 330-8 may store various program modules such as a writing module for drawing a line according to a drag trajectory when a user touches and drags an image, or an angle calculating module for calculating a pitch angle, a roll angle, a yaw angle, and the like based on a sensor value detected by a motion detector 182 in the electronic apparatus 100.

The application module 340 may include, for example, applications 340-1 to 340-n for supporting various functions. For example, the application module 340 may include a program module for providing various services, such as a navigation program module, a game module, an e-book program, a calendar program, and an alarm management program, or the like. The applications may be installed as default or may be arbitrarily installed or used by the user during use. In response to the UI element being selected, a main CPU 124 may execute an application corresponding to the selected UI element using the application module 340.

The configuration of the normal world illustrated in FIG. 4A is merely an example, and is not limited thereto. Some components of the electronic apparatus 100 may be omitted or modified or other components may be added according to a type of the electronic apparatus 100 or a purpose of the electronic apparatus 100. For example, the memory 140 may further include various programs such as a sensing module for analyzing signals sensed by various sensors, a messaging module such as a messenger program, a text message program, and an e-mail program, a call info aggregator program module, a VoIP module, and a web browser module.

For example, according to an example embodiment, the memory 140 of the normal world may further include an IoT service module and a key storage module.

According to an example embodiment, referring to FIG. 4B, the secure world of the memory 140 may include a secure OS 410, a network module 420, a key management module 430, and an IoT service module 440.

As described above, the secure OS 410 may be an OS into which a security kernel obtained by integrating a security function into the normal OS 310 is inserted.

The security network module 420 may, for example, be a network communication module driven on the secure OS 410 and may transmit a key value generated by the key management module 430 to another S node or N node. In addition, the security network module 420 may receive a key value used in security communication from another S node.

The key management module 430 may manage a key value used for security communication. For example, the key management module 430 may include a key generating module 433 and a key storing module 431. In this example, the key generating module 433 and the key storing module 431 may be embodied as software. The key generating module 433 may be a module used in communication with other nodes in order to enhance an IoT service. In this example, the key generating module 433 may also continuously generate a new key value during communication with other nodes.

The key storing module 431 may store a key value received from an external S node or a key value generated by the key generating module 433. The IoT service module 440 may perform an IoT service. For example, in response to a user command for performing an IoT service being input by a user, the IoT service module 440 may generate a control command using a key value stored in the key storing module 431. In addition, in response to a control command being received from outside, the IoT service module 440 may authenticate an external S node or decode the control command using the key value stored in the key storing module 431.

The aforementioned memory 140 of the secure world is merely an example embodiment and thus other modules may be further added or some modules may be omitted.

Referring back to FIG. 3, the detector (e.g., including various sensors or sensing circuitry) 150 may detect at least one of various changes such as pose change, illuminance change, and acceleration change of the electronic apparatus 100 and transmit an electrical signal corresponding thereto to the processor 120. For example, the detector 150 may detect state change that is generated based on the electronic apparatus 100, generate a detected signal according to the detected state change, and transmit the detected signal to the processor 120.

According to example embodiments, the detector 150 may include, for example, various sensors, and power is supplied to at least one sensor that is set according to control of the detector 150 (or based on user setting) during driving of the electronic apparatus 100 such that the detector 150 detects state change of the electronic apparatus 100. In this example, the detector 150 may include various sensors and include at least one device among all types of sensing devices for detecting state change of the electronic apparatus 100. For example, the detector 150 may include, for example, at least one of various sensing devices such as an acceleration sensor, a gyro sensor, an illuminance sensor, a proximity sensor, a pressure sensor, and a timer, or the like.

The input (e.g., including input circuitry) 160 may receive a user command. For example, the input 160 may be embodied as various input devices/circuitry, such as, for example, and without limitation, a touch panel, a button, a remote controller, a microphone, and a camera, for receiving the user command. For example, the touch panel of the input 160 may be coupled to the display 130 so as to be embodied as a touchscreen.

The function part 170 may be configured to perform various functions of the electronic apparatus 100. For example, when the electronic apparatus 100 is a smart phone, the function part 170 may be a component that performs telephone conversation with an external cellular phone. When the electronic apparatus 100 is a television (TV), the function part 170 may be a component for receiving a broadcast signal from outside. When the electronic apparatus 100 is a refrigerator, the function part 170 may be a component that performs cooling and freezing functions. For example, the function part 170 may be embodied in various forms according to a type of the electronic apparatus 100.

The processor 120 (or a controller) may be configured to control an overall operation of the electronic apparatus 100 using various programs stored in the memory 140.

The processor 120 may include RAM 121, ROM 122, a graphic processor 123, a main CPU 124, first to n$^{th}$ interfaces 125-1 to 125-n, and a bus 126. In this example, the RAM 121, the ROM 122, the graphic processor 123, the main CPU 124, the first to n$^{th}$ interfaces 125-1 to 125-n, and so on may be connected to each other through the bus 126.

The RAM 121 may store an O/S and an application program. For example, when the electronic apparatus 100 is booted, the O/S may be stored in the RAM 121 and various application data items selected by a user may be stored in the RAM 121.

The ROM 122 may store a command set and so on for system booting. When a turn-on command is input to supply power, the main CPU 124 may copy the O/S stored in the memory 140 to the RAM 121 and execute the O/S to boot a system based on the command stored in the ROM 122. When booting is completed, the main CPU 124 may copy various programs stored in the memory 140 to the RAM 121 and execute the application programs copied to the RAM 121 to perform various operations.

The graphic processor 123 may generate an image containing various objects such as an item, an image, and a text using a calculator (not shown) and a renderer (not shown). For example, the calculator may be a component for calculating an attribute value such as a coordinate value, a shape, a size, color, etc. for displaying objects according to a layout of a screen using a control command received from the input 160. In addition, the renderer may be a component for generating various layouts of images including an object based on the attribute value calculated by the calculator. The image generated by the renderer may be displayed in a display region of the display 130.

The main CPU 124 may access the memory 140 and perform booting using the OS stored in the memory 140. In addition, the main CPU 124 may perform various operations using various programs, contents, data, etc. which are stored in the memory 140.

The first to n$^{th}$ interfaces 125-1 to 125-n may be connected to the aforementioned various components. One of the first to n$^{th}$ interfaces 125-1 to 125-n may be a network interface connected to an external device.

The processor 120 may be configured to perform an IoT service in the secure OS. For example, when an application for performing the IoT service is executed while a specific function is performed in a normal world, the processor 120 may be configured to drive the secure OS so as to be operated as a secure world.

Figure 5A:
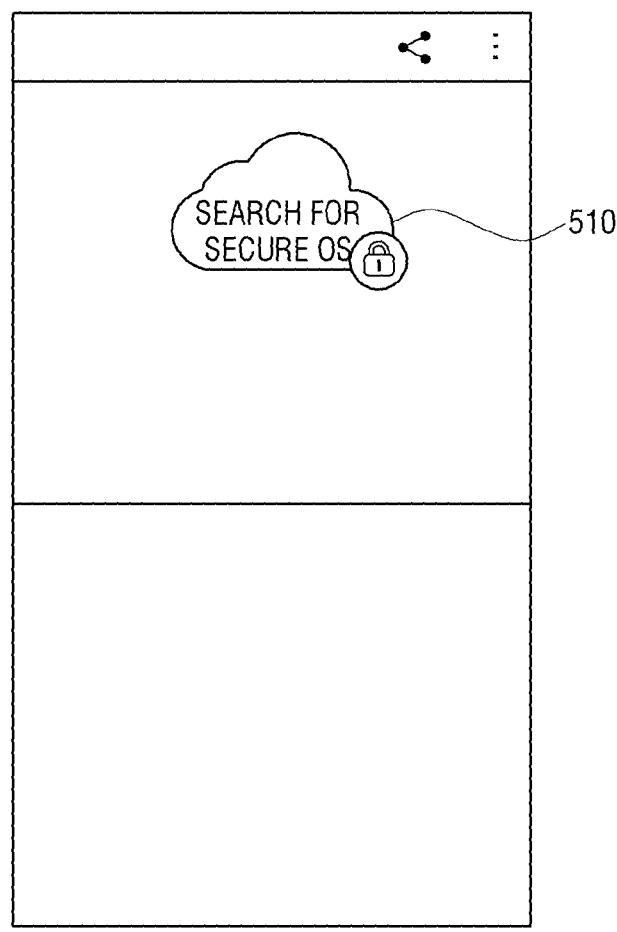
FIGS. 5A-5C, 6A, 6B, 7A-7C, 8, 9A-9C and 10 to 15 are diagrams illustrating example methods of performing an IoT service using a secure OS.

As illustrated in FIG. 5A, the processor 120 may be configured to control the display 130 to display a search UI for searching for a connectable S node. In this example, in response to a user command of selecting a search icon 510 contained in the search UI being input to the processor 120, the processor 120 may be configured to search for surrounding S nodes.

Figure 5B:
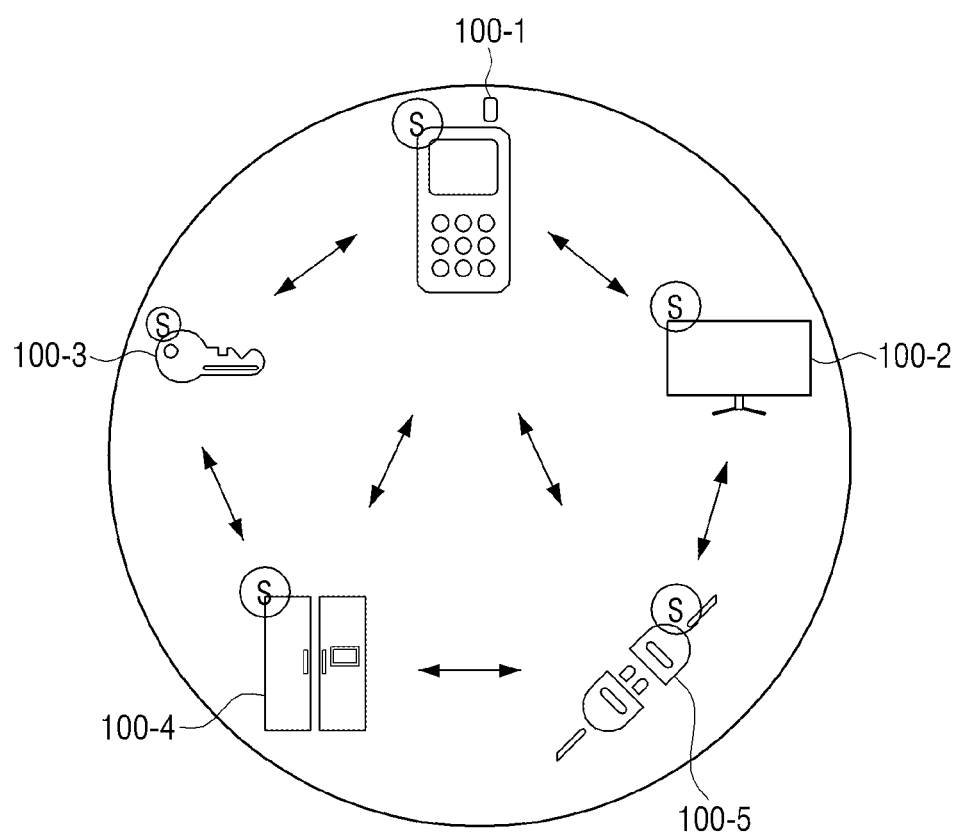

In this example, the processor 120 may be configured to receive device information including information about whether a secure OS is installed from external surrounding terminals and search for a connectable S node. For example, when the electronic apparatus 100 is a smart phone, the processor 120 may be an S node based on the received device information and may search for a smart TV 100-2, a front door apparatus 100-3, a refrigerator 100-4, and an electrical outlet apparatus 100-4, as illustrated in FIG. 5B.

Figure 5C:
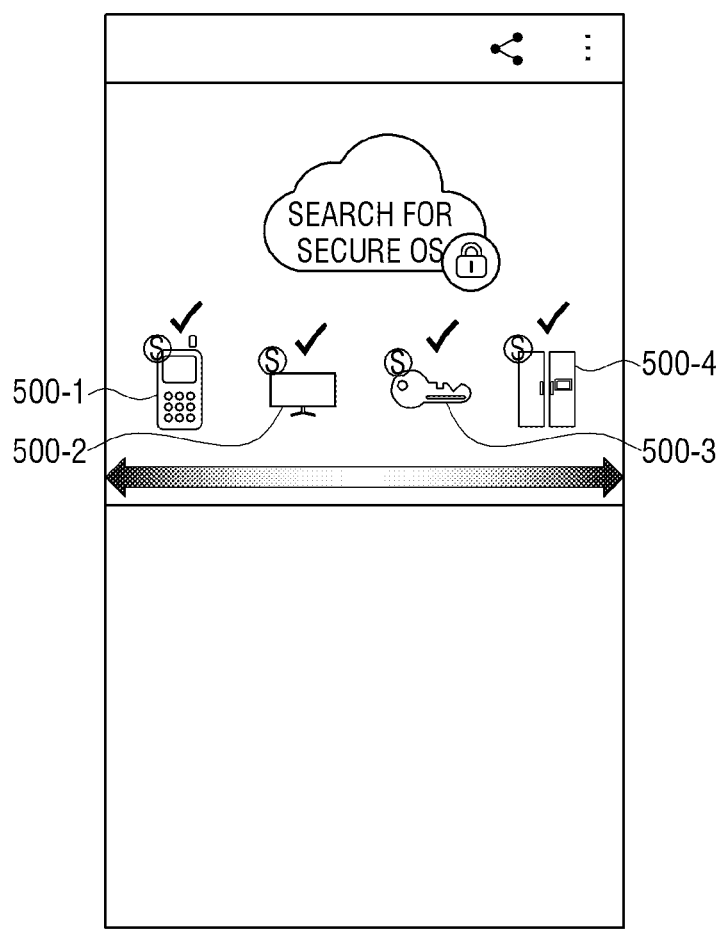

In response to the plurality of S nodes 100-2 to 100-5 being retrieved, the processor 120 may be configured to control the display 130 to display a UI containing an item corresponding to the electronic apparatus 100-1 and the retrieved S nodes 100-2 to 100-5. For example, as illustrated in FIG. 5C, the processor 120 may be configured to control the display 130 to display a UI including a first UI element 500-1 corresponding to the smart phone 100-1, a second UI element 500-2 corresponding to the smart TV 100-2, a third UI element 500-3 corresponding to the front door apparatus 100-3, and a fourth UI element 500-4 corresponding to the refrigerator 100-4. In this example, a fifth UI element 500-5 corresponding to the electrical outlet apparatus 100-5 may be displayed through, for example, a slide user command. In this example, a UI element may be an emoticon shaped like a corresponding device, but this is merely an embodiment, and thus the UI may be embodied in various forms such as a text, a picture, and an image.

In response to one UI element being selected among a plurality of UI elements, the processor 120 may be configured to perform communication connection with an S node corresponding to the selected UI element. In this example, the processor 120 may be configured to control the display 130 to display an identification mark (✓) around the selected UI element.

In addition, the electronic apparatus 100 and the selected S node may generate a key value for security communication in the secure OS 410 and perform secure communication in a network layer.

For example, during communication connection with the selected S node, the processor 120 may be configured to generate a first key value for communication with the selected S node using a key generating module 433-1 in a secure OS 410-1. In addition, the processor 120 may be configured to control the communicator 110 to transmit the generated first key value to the selected S node through a security communication module 420-1. In addition, the processor 120 may be configured to control the communicator 110 to receive a second key value from the selected S node through the security communication module 420-1 and store the received second key value in a key storing module 431-1. In addition, the processor 120 may be configured to control the communicator 110 to perform security communication using the first key value and the second key value.

In addition, the selected S node may also generate a second key value for communication with the electronic apparatus 100 using a key generating module 433-2 in a secure OS 410-2. In addition, the selected S node may transmit the generated second key value to the electronic apparatus 100 through a security communication module 420-2. In addition, the selected S node may receive the first key value from the electronic apparatus 100 through the security communication module 420-2 and store the received first key value in a key storing module 431-2. In addition, the selected S node may perform secure communication using the first key value and the second key value.

Figure 6A:
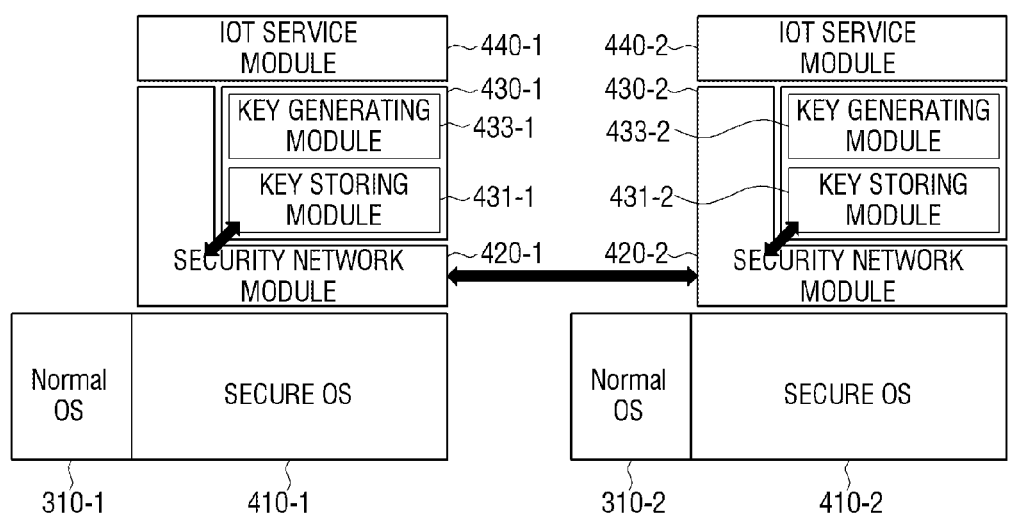

For example, as illustrated in FIG. 6A, the electronic apparatus 100 and the selected S node may perform secure communication through the security communication modules 420-1 and 420-2 as a network layer of a secure world using the first key value and second key value for secure communication.

For example, when at least one of the first key value and the second key value is not present, the processor 120 may be configured to determine that secure communication is not capable of being performed and block communication with the selected S node.

In addition, the processor 120 may be configured to continuously generate a key value for performing secure communication and to control the communicator 110 to transmit the key value to the selected S node. For example, during secure communication using the first key value and the second key value, the processor 120 may be configured to generate a new third key value for communication with the selected S node using the key generating module 433-1 in the secure OS. In addition, the processor 120 may be configured to control the communicator 110 to transmit the generated third key value to the selected S node through the security communication module 420-1. In addition, the processor 120 may be configured to control the communicator 110 to receive a new fourth key value from the selected S node through the security communication module 420-1 and store the received fourth key value in the key storing module 431-1. In addition, the processor 120 may be configured to control the communicator 110 to perform secure communication using the third key value and the fourth key value.

The selected S node may also update a key value and maintain secure communication like the electronic apparatus 100.

In addition, the electronic apparatus 100 and the selected S node may authenticate a counterpart electronic apparatus or encode or decode a control command using a key value of the IoT service module 440 of the secure OS so as to perform secure communication.

For example, in response to a user command (e.g., a TV on command) for performing an IoT service being input to the processor 120, the processor 120 may be configured to generate a control command using a second key value stored in the key storing module 431-1 through an IoT service module 440-1 of the secure OS 410-1. In this example, the processor 120 may be configured to contain authentication information in the control command or encode the control command using the second key value. In addition, the processor 120 may be configured to control the communicator 110 to transmit the generated control command to the selected S node.

The selected S node may receive the control command. In addition, the selected S node may authenticate the authentication information contained in the control command or decode the control command using the second key value stored in the key storing module 431-1 through an IoT service module 440-2 of the secure OS 410-2. In addition, the selected S node may control a function part 170 to perform an IoT service (e.g., a TV on command) based on the control command.

Figure 6B:
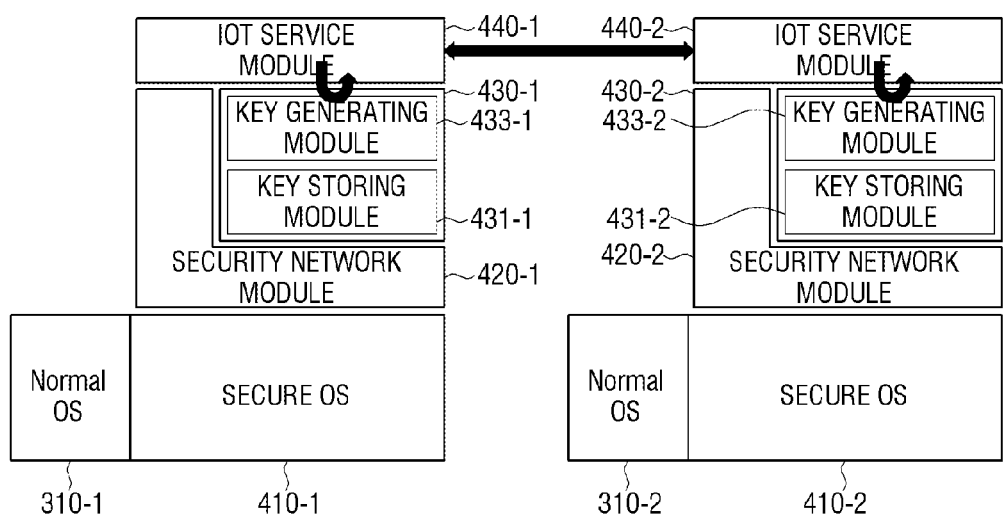

For example, as illustrated in FIG. 6B, the electronic apparatus 100 and the selected S node may generate and transmit the control command using a key value stored in the key storing module 431 to perform secure communication in a service application layer end of the secure world.

Although a control command is generated using a second key value according to the aforementioned example embodiment, this is merely an example embodiment, and thus the control command may be generated using the first key value or both of the first and second key values.

In addition, the processor 120 may be configured to perform secure communication with an N node in the secure OS 410 to provide an IoT service.

Figure 7A:
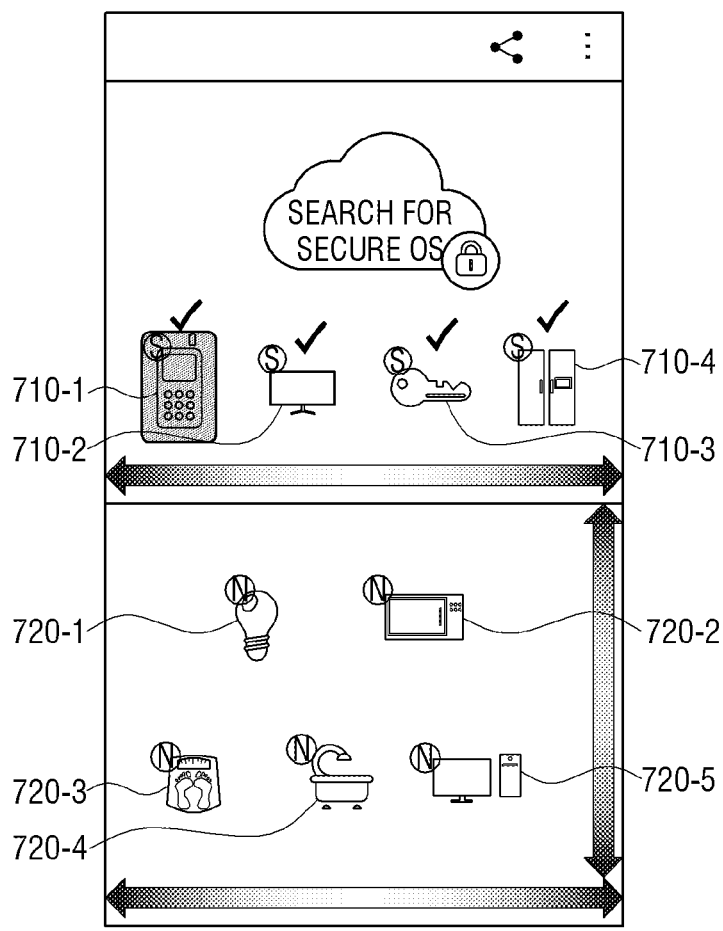

For example, during display of a UI illustrated in FIG. 7A, in response to a user command for selection of a first UI element 710-1 being input to a processor 410, the processor 410 may be configured to control the display 130 to display a plurality of UI elements corresponding to N nodes connectable to the first UI element 710-1, as illustrated in FIG. 7A. For example, the processor 120 may be configured to control the display 130 to display a fifth UI element 720-1 corresponding to an illuminance apparatus 200-1, a seventh UI element 720-2 corresponding to a microwave 200-2, an eighth UI element 720-8 corresponding to a scale 200-3, a ninth UI element 720-4 corresponding to a bathtub 200-4, and a tenth UI element 720-5 corresponding to a desk top PC 200-5, as illustrated in FIG. 7A.

Figure 7B:
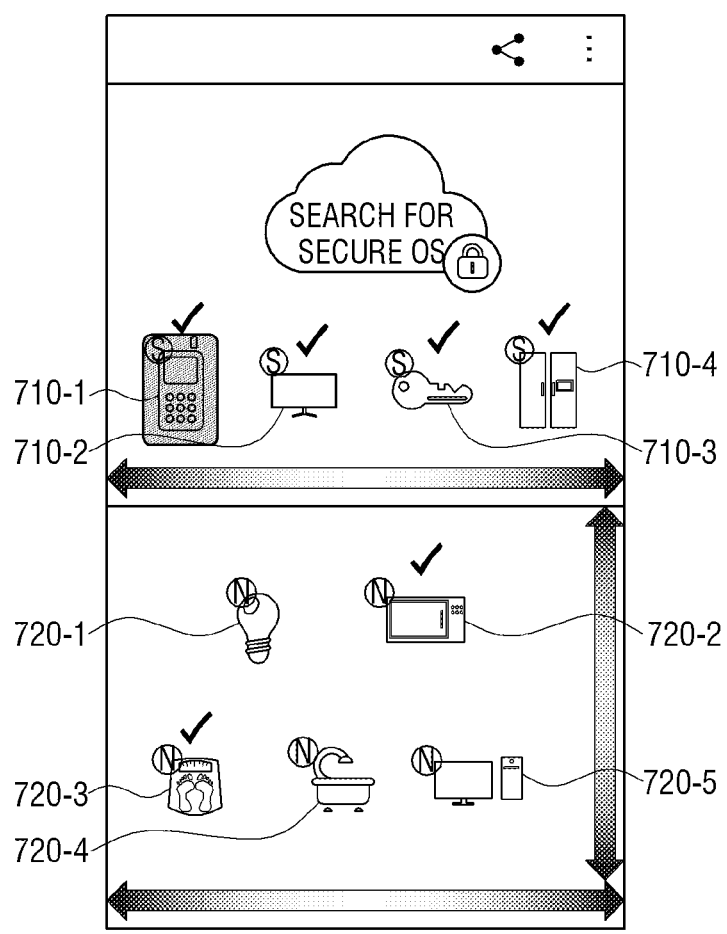

In addition, in response to a user command for selection of at least one of UI elements corresponding to N nodes being input to the processor 120 in order to perform communication connection, the processor 120 may be configured to perform communication connection with an N node corresponding to the selected UI element. For example, in response to a user command for selection of the seventh UI element 720-2 and an eighth UI element 720-3 being input to the processor 120, the processor 120 may be configured to perform communication connection with the microwave 200-2 and a scale 200-3. In addition, the processor 120 may be configured to control the display 130 to display an indicator (✓) around the seventh UI element 720-2 and the eighth UI element 720-3 and to differently display the seventh UI element 720-2 and the eighth UI element 720-3 from another UI elements, as illustrated in FIG. 7B.

Figure 7C:
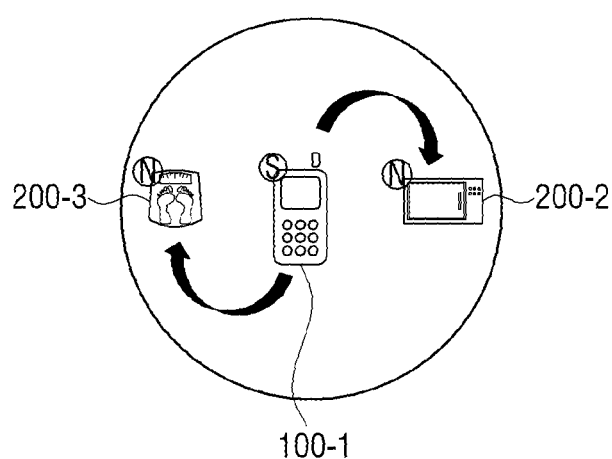

As illustrated in FIG. 7C, when the electronic apparatus 100 is the smart phone 100-1, the smart phone 100-1 may perform communication connection with the microwave 200-2 and the scale 200-3 as an N node.

In addition, the processor 120 may be configured to generate a control command through the IoT service module 440-1 of the secure OS 410-1 so as to provide an IoT service with enhanced security to the N node.

For example, when communication connection is performed, the processor 120 may be configured to generate a fifth key value through key generating module 433-1 of the secure OS 410-1 and to control the communicator 110 to transmit the fifth key value to the selected N node. In this example, the N node may store the received fifth key value in a key storing module 820.

In addition, in response to a user command for performing an IoT service being input to the processor 120, the processor 120 may be configured to generate a control command using the fifth key value through the IoT service module 440-1 of the secure OS 410-1 and to control the communicator 110 to transmit the generated control command to the selected N node. The selected N node may receive the control command and authenticate or decode the control command using the fifth key value stored in the key storing module 820 through the IoT service module 830 of a normal OS 810. In addition, the selected N node may control the function part 170 to perform an IoT service based on the control command.

Figure 8:
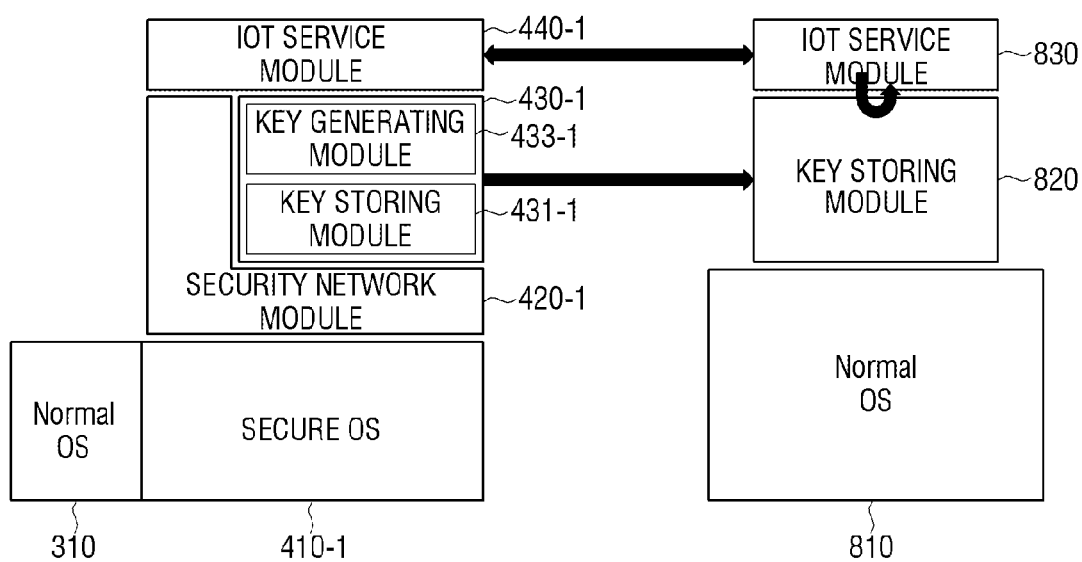

For example, as illustrated in FIG. 8, the electronic apparatus 100 may transmit the generated key value to the N node through the key generating module 433-1 to the N node, and the N node may perform the IoT service using the key value received from the electronic apparatus 100 as an S node.

Meanwhile, the N node may generate a control command, and transmit the generated control command to the electronic apparatus 100. In this example, the N node may transmit a request for a key value to the electronic apparatus 100 in order to perform security communication with the electronic apparatus 100. The electronic apparatus 100 may generate a key value through the key generating module 433-1 of the secure OS 410-1, store the generated key value in a key storing module 820, and transmit the generated key value to the N node. The N node may encrypt the control command using the received key value, and transmit the encrypted control command to the electronic apparatus 100. The electronic apparatus 100 which received the encrypted control command may decode the encrypted control command using the key value stored in the key storing module 820, and may control the function part 170 to perform IoT service according to the control command.

Via the aforementioned method, the S node may provide an IoT service with enhanced security through another S node or N node.

Figure 9A:
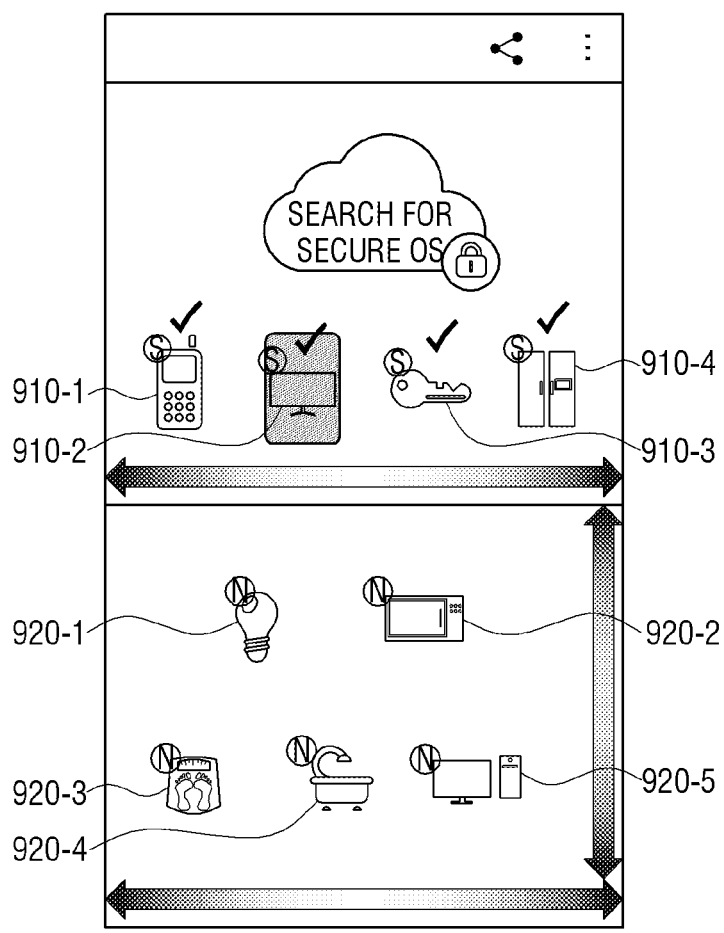

The processor 120 may be configured to perform communication connection with the N node through another S node. For example, as illustrated in FIG. 9A, in response to a user command for selection of a second UI element 910-2 being input to the processor 120 during display of a UI, the processor 120 may be configured to search for N nodes connectable to the smart TV 100-2 as an S node. In addition, as illustrated in FIG. 9A, the processor 120 may be configured to control the display 130 to display a plurality of UI elements 920-1 to 920-5 corresponding to the retrieved N nodes.

Figure 9B:
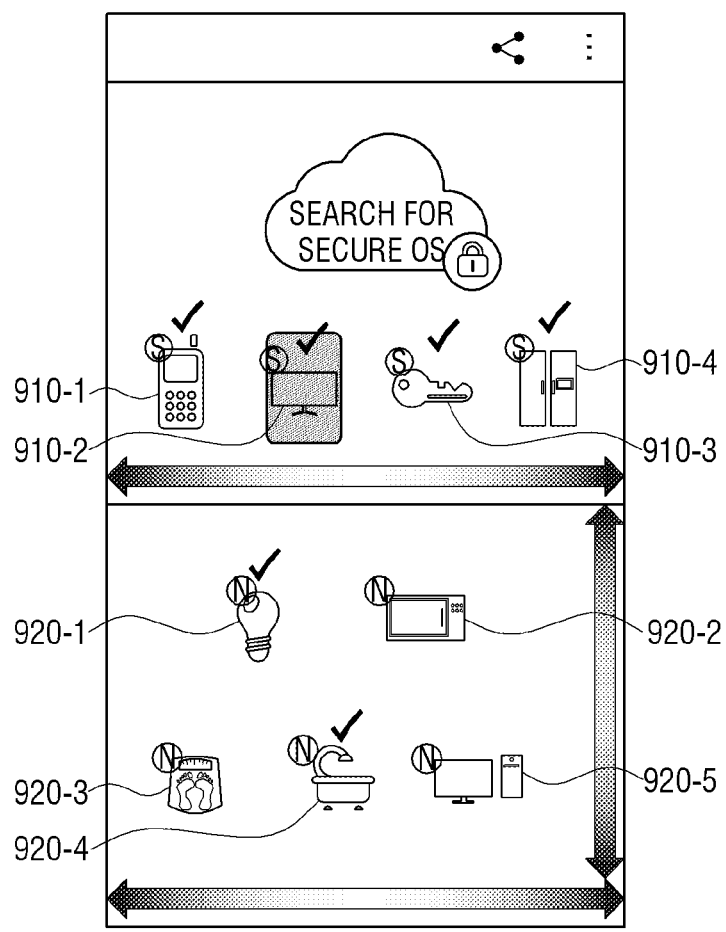
Figure 9C:
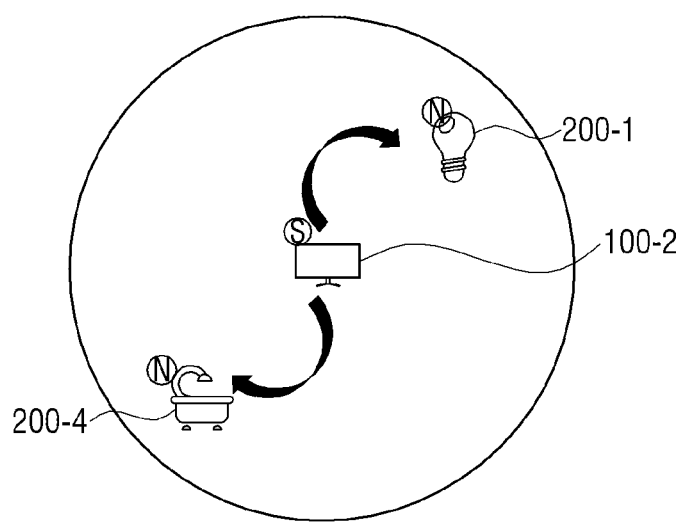

In addition, in response to a user command for selection of a sixth UI element 920-1 and a ninth UI element 920-4 being input to the processor 120, the processor 120 may be configured to control the display 130 to display an indicator (✓) around the sixth UI element 920-1 and the ninth UI element 920-4 and to differently display the sixth UI element 920-1 and the ninth UI element 920-4 from another UI element, as illustrated in FIG. 9B. In addition, the processor 120 may be configured to control the communicator 110 to transmit a control command for performing communication connection with the illuminance apparatus 200-1 and the bathtub 200-4 to the smart TV 100-2. In response to the control command being transmitted, the smart TV 100-2 may perform communication connection with the illuminance apparatus 200-1 and the bathtub 200-4, as illustrated in FIG. 9C.

When the smart TV 100-2 is connected to the illuminance apparatus 200-1 and the bathtub 200-4, the processor 120 may be configured to communicate with the illuminance apparatus 200-1 and the bathtub 200-4 as an N node through the smart TV 100-2. For example, in response to a user command for transmission of a control command to the illuminance apparatus 200-1 being input to the processor 120, the processor 120 may be configured to generate a control command using the first key value in the secure OS and control the communicator 110 to transmit the generated control command to the smart TV 100-2. In addition, the smart TV 100-2 may transmit the control command to the illuminance apparatus 200-1, and the illuminance apparatus 200-1 may decode the control command using the key value received from the smart TV 100-2 and perform a function corresponding to the control command.

Figure 10:
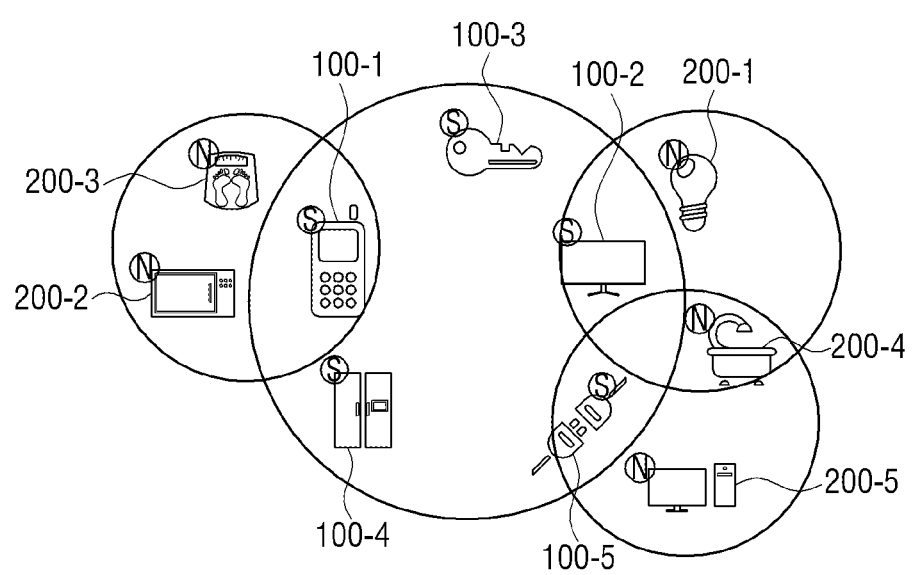

In addition, when communication connection between another S node and N node is performed via the aforementioned method, a security network system illustrated in FIG. 10 may be established. For example, communication connection may be performed between the smart phone 100-1, the smart TV 100-2, the front door apparatus 100-3, the refrigerator 100-4 and the electrical outlet apparatus 100-5 as the S nodes. Further, communication connection may be performed between the smart phone 110-1 as the S node and the microwave oven (MWO) 200-2 and the scale 200-3 as the N nodes. Further, communication connection may be performed between the smart TV 100-2 as the S node and the illuminance apparatus 200-1 and the bathtub 200-4 as the n nodes. Further, communication connection may be performed between the electrical outlet apparatus 100-5 as the S node and the bathtub 200-4 and the desktop PC 200-5 as the N nodes.

Figure 11:
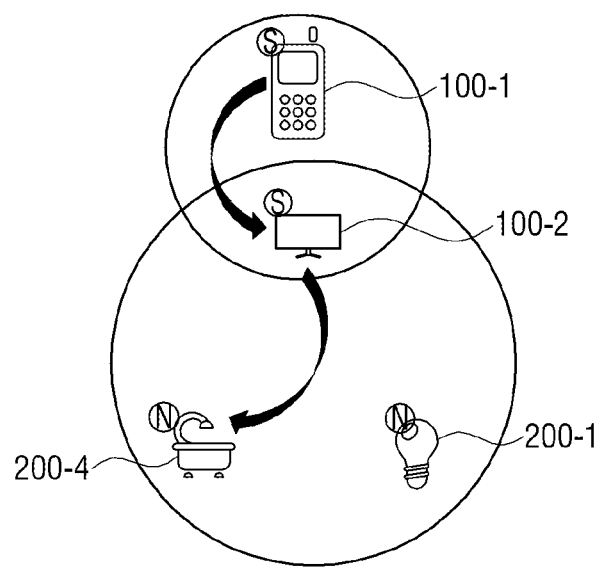

When the security network system illustrated in FIG. 10 is established, the electronic apparatus 100 may transmit a control command to an N node that is not directly connected to the electronic apparatus 100 through another S node so as to perform an IoT service. For example, while the security network system illustrated in FIG. 10 is established, in order to control the bathtub 200-4 through the smart phone 100-1, the smart phone 100-1 may transmit the control command to the smart TV 100-2 as the S node connected to the bathtub 200-4, and the smart TV 100-2 may re-transmit the transmitted control command to the bathtub 200-4, as illustrated in FIG. 11. In this example, security communication between the smart phone 100-1 and the smart TV 100-2 may be performed through the secure OS, as illustrated in FIGS. 6A and 6B, and security communication between the smart TV 100-2 and the bathtub 200-4 may be performed through the secure OS, as described with reference to FIG. 8.

When the security network system illustrated in FIG. 10 is established, the smart phone 100-1 may group and manage another S node and N nodes. For example, the smart phone 100-1 may group a first group including the N nodes 200-2 and 200-3 that are directly connected to the smart phone 100-1, a second group including the smart TV 100-2 and the N nodes 200-1 and 200-4 connected to the smart TV 100-2, and a third group including a smart electrical outlet 100-5 and the N nodes 200-4 and 200-5 connected to the smart electrical outlet 100-5 and manage each group. In this example, a reference for grouping may be a connectable S node, but this is merely an example embodiment, and thus the reference may be positions, functions, and so on of the N nodes. For example, the smart phone 100-1 may perform grouping based on positions (a bedroom, a living room, a bathtub, and a kitchen) of N nodes or functions (a temperature managing function and a security function) of the N nodes.

According to the aforementioned example embodiment, a user may be remotely served with an IoT service having more enhanced security.

In order to transmit a control command to another S node or N node, the processor 120 may be configured to transmit a control command using a UI illustrated in FIG. 7A. For example, in response to one electronic apparatus being selected among a plurality of electronic apparatuses contained in the UI, the processor 120 may be configured to control the display 130 to display a control menu for control the selected electronic apparatus. For example, in response to the tenth UI element 720-5 being selected among a plurality of UI elements contained in the UI, the processor 120 may be configured to control the display 130 to display a control menu for controlling the desktop PC 200-5 corresponding to the tenth UI element 720-5. In this example, the control menu may be displayed around the selected UI element and displayed on a new window.

As another example, in the security network system as in FIG. 10, an electronic apparatus operating as the N node may perform security communication with other N and S nodes through an S node in which the secure OS is installed. In this example, the electronic apparatus operating as the N node may be various types of apparatuses as in embodiments of the electronic apparatus 100 as described in FIG. 2, and the electronic apparatus operating as the N node may be an apparatus in which only a normal OS is installed in a block diagram of the electronic apparatus 100 of FIG. 2.

In FIG. 10, the electronic apparatus operating as the N node 200-5 (e.g. desktop PC) may perform security communication with other N nodes or S nodes through an S node in which the secure OS is installed.

Figure 12:
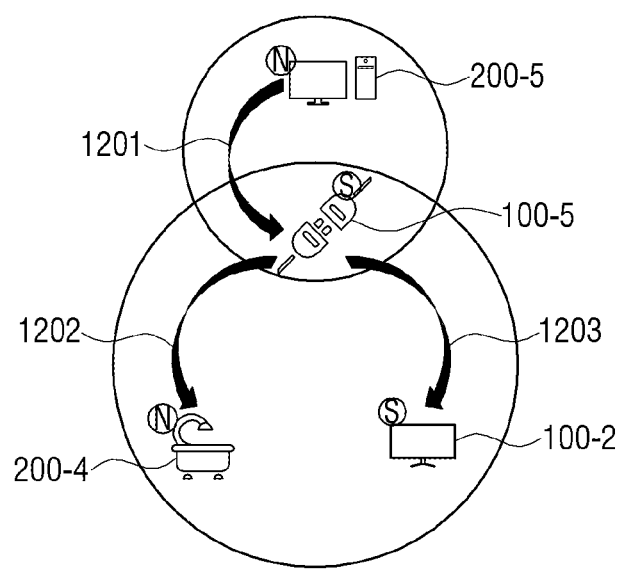

For example, in the case where the electronic apparatus 200-5 as the N node performs security communication to control the bathtub 200-4 as the N node, in response to the electronic apparatus 200-5 transmitting a control command to the electrical outlet apparatus 100-5 as the S node connected with the bathtub 200-4 according to an arrow direction 1201 as illustrated in FIG. 12, the electrical outlet apparatus 100-5 may transmit the received control command back to the bathtub 200-4 according to an arrow direction 1202 as illustrated in FIG. 12. In this example, the security communication between the N node and the S node may be performed through the secure OS as described in FIG. 8.

As another example, in the case where the electronic apparatus 200-5 as the N node performs security communication to control the smart TV 100-2 as the S node, when the electronic apparatus 200-5 transmits a control command to the electrical outlet apparatus 100-5 as the S node connected with the smart TV 100-2 through an arrow direction 1201 as illustrated in FIG. 12, the electrical outlet apparatus 100-5 may transmit the received control command back to the smart TV 100-2 according to an arrow direction 1203 as illustrated in FIG. 12. In this example, the security communication between the N node and the S node may be performed through the secure OS as described in FIG. 8, and the security information between the S nodes may be performed through the secure OS as described in FIGS. 6A and 6B.

According to another embodiment, the electronic apparatus operating as the N node 200-5 (e.g. desktop PC) may perform security communication with other N nodes through S nodes included in a group where the electronic apparatus 200-5 belongs and S nodes included in a group where the electronic apparatus 200-5 does not belong.

Figure 13:
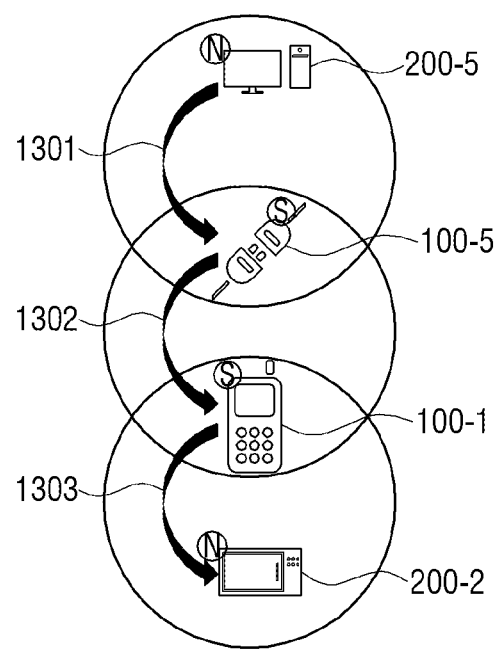

For example, in the case where the electronic apparatus 200-5 performs security communication to control a microwave oven 200-2 as the N node, when the electronic apparatus 200-5 transmits a control command to the electrical outlet apparatus 100-5 as the S node which belongs to a same group according to an arrow direction 1301 as illustrated in FIG. 13, the electrical outlet apparatus 100-5 may transmit the received control command to the smart phone 100-1 as the S node which belongs to another group according to an arrow direction 1302 as illustrated in FIG. 13. The smart phone which received the control command may transmit the received control command back to the microwave oven (MWO) according to an arrow direction 1303. In this example, the security communication between the N node and the S node may be performed through the secure OS as described in FIG. 8, and the security information between the S nodes may be performed through the secure OS as described in FIGS. 6A and 6B.

Meanwhile, when the N node is to transmit a control command to other N nodes or S nodes through the S node in which the secure OS is installed, the N node may transmit a control command using the UI as illustrated in FIG. 7.

For example, a UI element corresponding to an S node connectable with the electronic apparatus as the N node may be displayed. When a user command to select a UI element is input, the electronic apparatus as the N node may display a plurality of UI elements corresponding to N nodes and S nodes which are connectable with the S node. In this example, when a UI element is selected among a plurality of UI elements, the electronic apparatus as the N node may display a control menu to control the UI element. In this example, the control menu may be displayed around the selected UI element or displayed on a new window.

Figure 14:
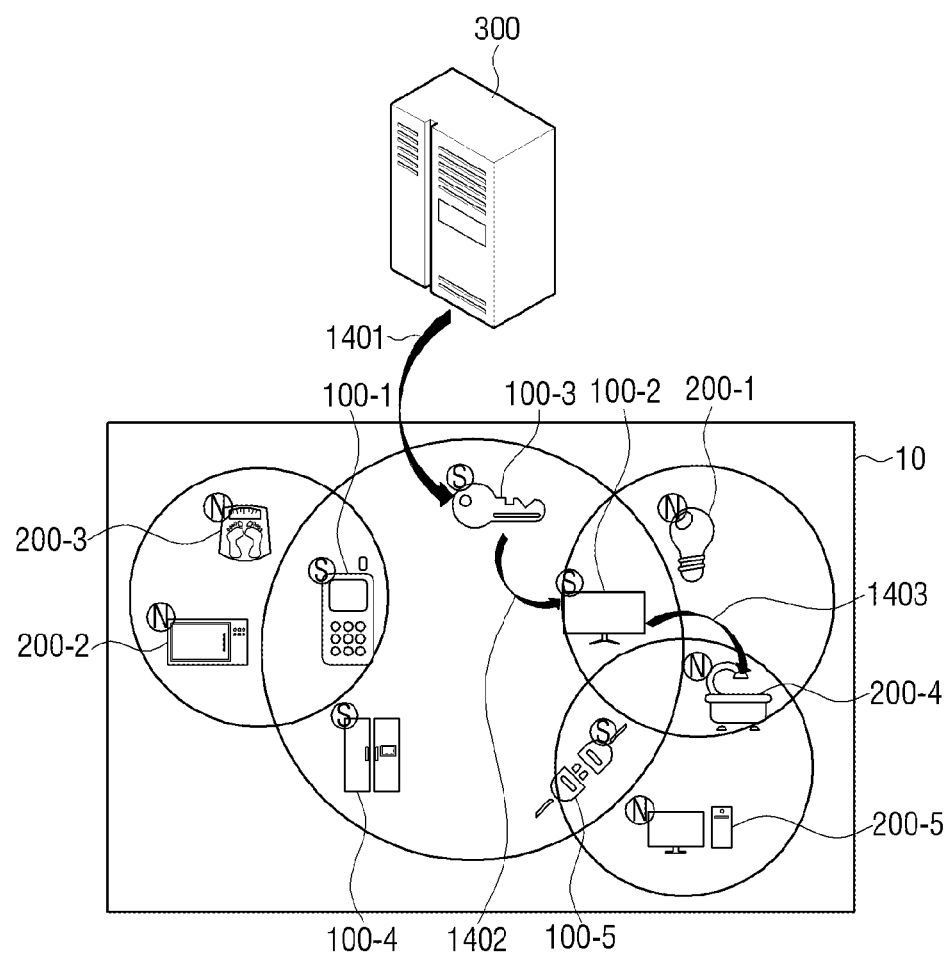

Further, in the case where a security network system 10 is equipped in a house as illustrated in FIG. 14, an external apparatus 300 positioned outside the security network system 10 may attempt to perform communication connection with an electronic apparatus included in the security network system 10. In this example, to perform security communication with the electronic apparatus 300, an S node in which the security OS included in the security network system 10 is installed may serve as a hub which receives a control command from the external apparatus 300.

For example, when the external apparatus 300 is to control the bathtub 200-4 as the N node which belongs to the security network system 10, the external apparatus 300 may attempt to perform communication connection with the front door apparatus 100-3 as the S-node which serves as a hub. The front door apparatus 100-3 as the S node may determine whether the external apparatus 300 is given an access to the security network system 100, and if yes, perform security communication with the external apparatus 300 to receive a control command from the external apparatus 300 according to an arrow direction 1401. For example, the front door apparatus 100-3 may transmit a key value generated in a secure OS to the external apparatus 300. The external apparatus 300 may encrypt a control command using the received key value, and transmit the encrypted control command to the front door apparatus 100-3 according to the arrow direction 1401.

The front door apparatus 100-3 which received the control command may transmit the received control command to a smart TV 100-2 as the S node of a group where the bathtub 200-4 belongs according to an arrow direction 1402. The smart TV 100-2 which received the control command may transmit the received control command back to the bathtub 200-4 according to an arrow direction 1403. The bathtub 200-4 may perform a function according to the received control command. In this example, security communication between the external apparatus 300 and the S node may be performed through the secure OS as described in FIG. 8, and security communication between S nodes within the security network system 10 may be performed through the secure OS as described in FIGS. 6A and 6B.

Figure 15:
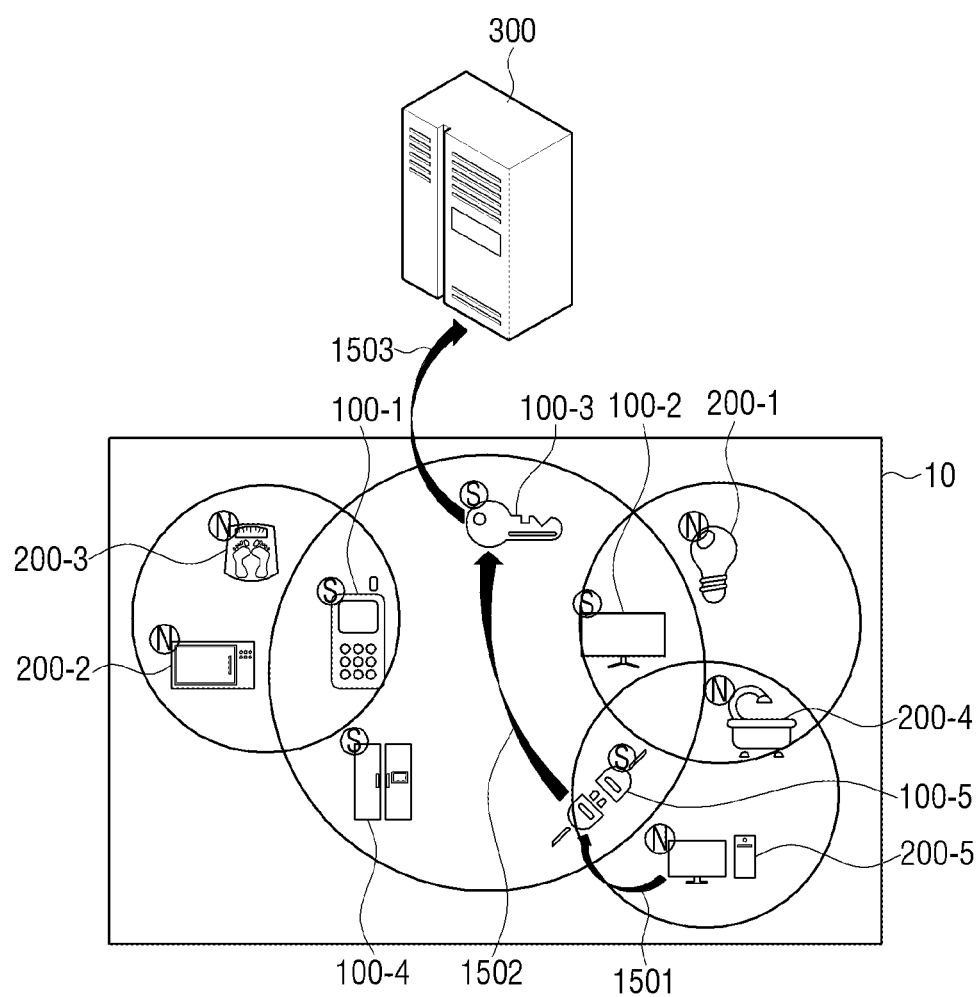

Meanwhile, as illustrated in FIG. 15, when a house is equipped with the security network system 10, an internal apparatus which belongs to the security network system 10 may attempt to perform communication connection with an external apparatus 300 positioned outside the security network system 10. In this example, an S node included in the security network system 10 may serve as a hub which transmits a control command.

For example, when a desktop PC 200-5 as the N node which belongs to the security network system 10 is to transmit a control command to the external apparatus 300, as illustrated in FIG. 15, the desktop PC 200-5 may transmit a control command to the electrical outlet apparatus 100-5 as the S node of a group where the desktop PC 200-5 belongs according to an arrow direction 1501. The electrical outlet apparatus 100-5 may transmit the received control command back to the front door apparatus 100-3 which serves as a hub according to the arrow direction 1502. Further, the front door apparatus 100-3 may transmit the received control command to the external apparatus 300 according to an arrow direction 1503. In this example, the front door apparatus 100-3 may perform security communication with the external apparatus 300 to transmit the control command according to the arrow direction 1503. For example, the front door apparatus 100-3 may transmit a key value generated in a secure OS to the external apparatus 300. Further, the front door apparatus 100-3 may encrypt a control command using a generated key value, and transmit the encrypted control command to the encrypted control command. The external apparatus 300 may decode the encrypted control command using a pre-stored key value, and perform a function according to the encryption. In this example, security communication between the external apparatus 300 and the S node may be performed through the secure OS as described in FIG. 8, and security communication between S nodes within the security network system 10 may be performed through the secure OS as described in FIGS. 6A and 6B.

Figure 16:
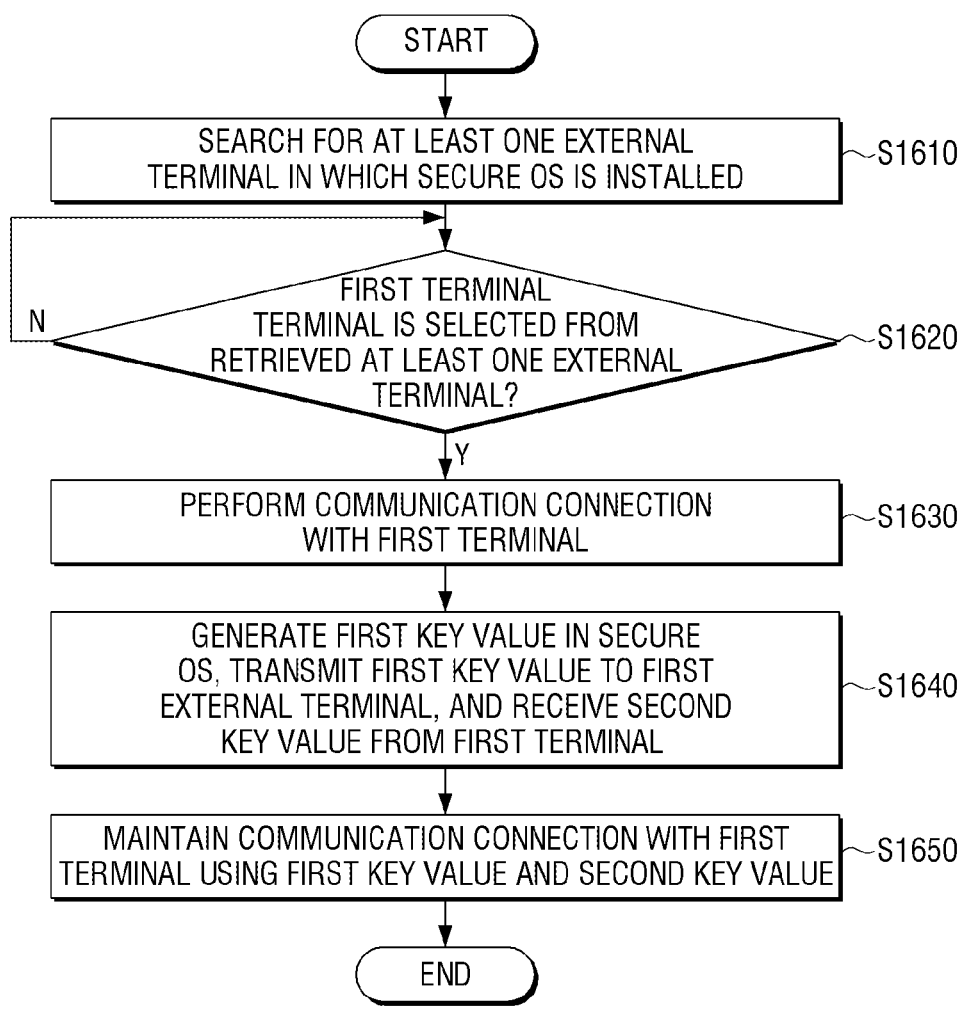
FIG. 16 is a flowchart illustrating an example method of controlling an electronic apparatus.

FIG. 16 is a flowchart illustrating an example method for controlling the electronic apparatus 100. In this example, the electronic apparatus 100 may be an S node in which a secure OS is installed.

The electronic apparatus 100 may search for at least one external terminal in which the secure OS is installed (S1610).

In addition, the electronic apparatus 100 may determine whether a user command for selection of one from the retrieved at least one external terminal is input (S1620). In this case, selection of the first terminal may be performed through a UI illustrated in FIG. 5C.

In response to the first terminal being selected (S1620), the electronic apparatus 100 may perform communication connection with the first terminal (S1630).

In addition, the electronic apparatus 100 may generate the first key value in the secure OS, transmit the first key value to the first terminal, and receive a second key value from the first terminal (S1640). In this example, the first key value and the second key value may be continuously updated.

In addition, the electronic apparatus 100 may maintain communication connection with the first terminal using the first key value and the second key value (S1650). For example, the electronic apparatus 100 may provide an IoT service with enhanced security using the first key value and the second key value in a network layer and service application layer of the secure OS. In addition, when at least one of the first key value and the second key value is not present, the electronic apparatus 100 may block communication connection.

Figure 17:
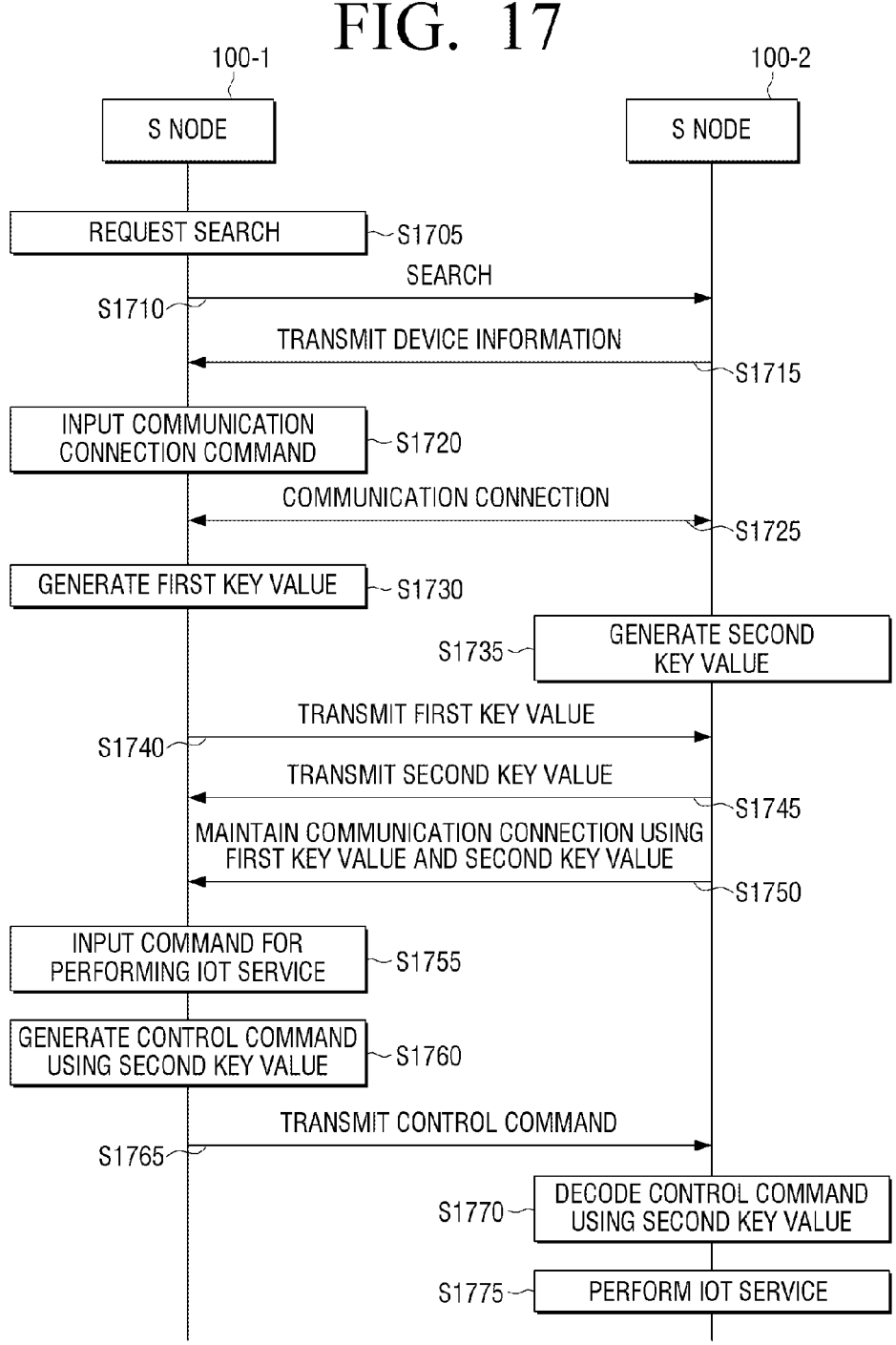
FIG. 17 is a sequence diagram illustrating an example method of providing an IoT service of a security network system.

FIG. 17 is a sequence diagram illustrating an example method for providing an IoT service of the security network system 10.

The first S node 100-1 may receive search request (S1705).

In addition, the first S node 100-1 may search for another S node and retrieve the second S node 100-2 (S1710) and the second S node 100-2 may transmit device information to the first S node 100-1 (S1715). In this example, the device information may include information indicating that the secure OS is installed in the second S node 100-2.

In addition, the first S node 100-1 may receive a communication connection command (S1720) and perform communication connection with the second S node 100-2 (S1725). In this example, the first S node 100-1 and the second S node 100-2 may be operated as a secure world.

In addition, the first S node 100-1 may generate the first key value (S1730) and the second S node 100-2 may generate the second key value (S1735). In addition, the first S node 100-1 may transmit the first key value to the second S node 100-2 (S1340) and the second S node 100-2 may transmit the second key value to the first S node 100-1 (S1745).

The first S node 100-1 and the second S node 100-2 may maintain communication connection using the first key value and the second key value (S1750).

In addition, the first S node 100-1 may receive a command for performing an IoT service (S1755). The first S node 100-1 may generate a control command using the second key value in the secure OS (S1760). For example, the first S node 100-1 may encode a control command using the second key value.

The first S node 100-1 may transmit the generated control command to the second S node (S1765).

The second S node 100-2 may decode the control command using the second key value in the secure OS (S1775).

The second S node 100-2 may perform the IoT service based on the decoded control command (S1780).

According to the aforementioned various example embodiments, communication with an external device may be performed using a secure OS, and thus access from outside a security network may be difficult and/or impossible so as to enhance communication security between IoT terminals.

Figure 18:
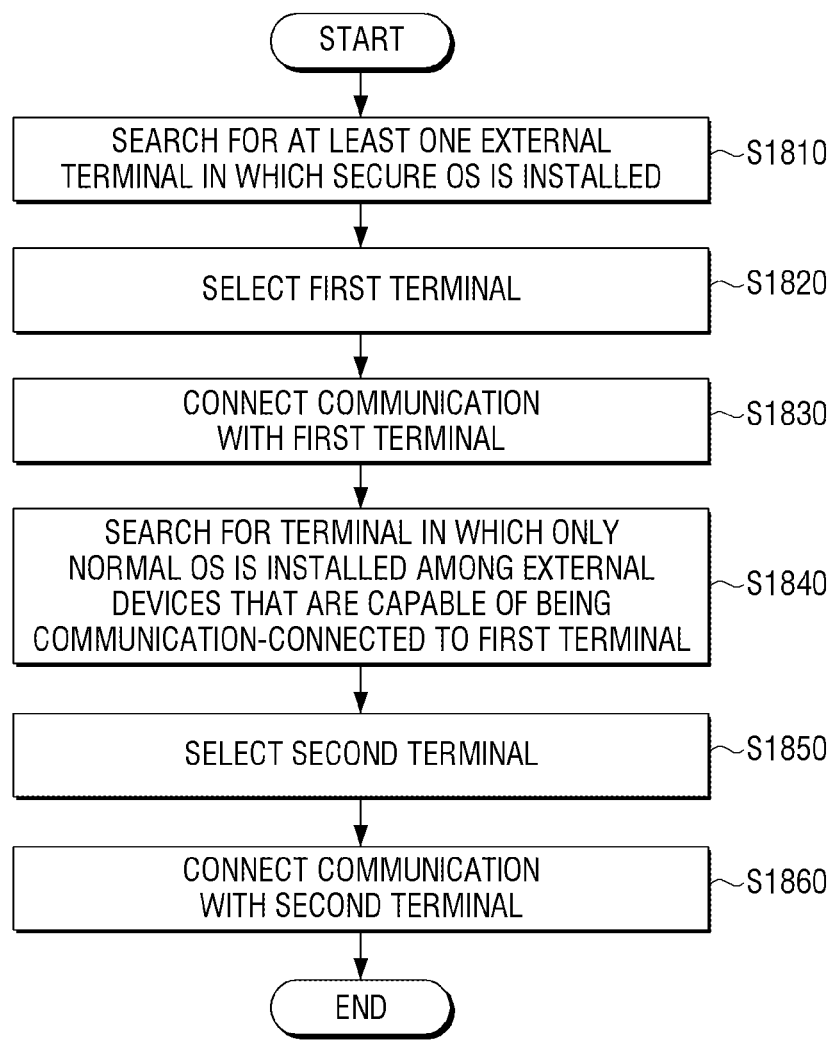
FIG. 18 is a flowchart illustrating an example method of controlling an electronic apparatus.

FIG. 18 is a flowchart illustrating an example method of controlling the electronic apparatus 100. In this example, the electronic apparatus 100 may be an S node in which a secure OS is installed.

The electronic apparatus 100 may search for at least one external terminal in which the secure OS is installed (S1810).

In addition, the electronic apparatus 100 may determine whether a user command for selection of a first terminal from the retrieved at least one external terminal is input and select the first terminal based on the user command (S1820). In this example, selection of the first terminal may be performed through a UI illustrated in FIG. 5C.

In response to the first terminal being selected, the electronic apparatus 100 may perform communication connection with the first terminal (S1830).

In addition, the electronic apparatus 100 may search for a terminal in which only a normal OS is installed among external terminals that are capable of being communication-connected with the first terminal (S1840). For example, the electronic apparatus 100 may receive information about a connectable N node from the first terminal so as to be communication-connected to the first terminal and to search for an electronic apparatus in which only a normal OS is installed.

In addition, the electronic apparatus 100 may determine whether a user command for selection of a second terminal from the retrieved at least one external terminal is input and select the second terminal based on the user command (S1850). In this example, selection of the second terminal may be performed through a UI illustrated in FIG. 9A.

In addition, the electronic apparatus 100 may perform communication connection with the selected second terminal (S1860). In this case, the electronic apparatus 100 may communicate with the second terminal through the first terminal.

The apparatuses (e.g., modules or the electronic apparatus 100) or methods (e.g., operations) according to various example embodiments may be implemented by at least one computer (e.g., the processor 120) for execution of an instruction included in at least one program among programs maintained in computer-readable storage media.

When the instruction is executed by a computer (e.g., the processor 120), the at least one computer may perform a function corresponding to the command. In this example, the computer-readable storage media may be, for example, the memory 120.

The program may be included in the computer-readable storage media, for example, a hard disk, a floppy disk, magnetic media (e.g., a magnetic tape), optical media (e.g., compact disc read only memory (CD-ROM), digital versatile disc (DVD), magneto-optical media (e.g., floptical disk), and a hardware apparatus (e.g., read only memory (ROM), random access memory (RAM), or flash memory). In this example, the storage media is generally included in a portion of components of the electronic apparatus 100 but may be installed through a port of the electronic apparatus 100 or may be included in an external device (e.g., cloud, server, or other electronic devices) positioned outside the electronic apparatus 100. In addition, the program may be divided and stored in a plurality of storage media, and in this case, at least a portion of a plurality of storing media may be positioned in an external device of the electronic apparatus 100.

The instruction may include a high-level language code that is executable by a computer using an interpreter and so on as well as a machine language code such as a code made by a compiler. The aforementioned hardware apparatus may be configured to operate as one or more software modules in order to perform operations according to various example embodiments and the converse may also be possible. As described above, and will be appreciated by those skilled in the art, the described systems, methods and techniques may be implemented in digital electronic circuitry including, for example, electrical circuitry, logic circuitry, hardware, computer hardware, firmware, software, or any combinations of these elements. Apparatus embodying these techniques may include appropriate input and output devices, a computer processor, and a computer program product tangibly embodied in a non-transitory machine-readable storage device or medium for execution by a programmable processor. A process embodying these techniques may be performed by a programmable hardware processor executing a suitable program of instructions to perform desired functions by operating on input data and generating appropriate output. The techniques may be implemented in one or more computer programs that are executable on a programmable processing system including at least one programmable processor coupled to receive data and instructions from, and transmit data and instructions to, a data storage system, at least one input device, and at least one output device. Each computer program may be implemented in a high-level procedural or object-oriented programming language or in assembly or machine language, if desired; and in any case, the language may be compiled or interpreted language. Suitable processors include, by way of example, both general and special purpose microprocessors. Generally, a processor will receive instructions and data from a read-only memory and/or a random access memory. Non-transitory storage devices suitable for tangibly embodying computer program instructions and data include all forms of computer memory including, but not limited to, non-volatile memory, including by way of example, semiconductor memory devices, such as Erasable Programmable Read-Only Memory (EPROM), Electrically Erasable Programmable Read-Only Memory (EEPROM), and flash memory devices; magnetic disks, such as internal hard disks and removable disks; magneto-optical disks; Compact Disc Read-Only Memory (CD-ROM), digital versatile disk (DVD), Blu-ray disk, universal serial bus (USB) device, memory card, or the like. Any of the foregoing may be supplemented by, or incorporated in, specially designed hardware or circuitry including, for example, application-specific integrated circuits (ASICs) and digital electronic circuitry. Thus, methods for providing image contents described above may be implemented by a program including an executable algorithm that may be executed in a computer, and the program may be stored and provided in a non-transitory computer readable medium.

The foregoing example embodiments and advantages are merely exemplary and are not to be construed as limiting the disclosure. The disclosure can be readily applied to other types of apparatuses. Also, the description of the example embodiments is intended to be illustrative, and not to limit the scope of the claims, and many alternatives, modifications, and variations will be apparent to those skilled in the art.

What is claimed is:

1. A method for controlling an electronic apparatus in which a normal operating system (OS) and a secure OS are installed, the method comprising:
    searching, by the electronic apparatus in which the normal OS and the secure OS are installed, for at least one external terminal in which a secure OS is installed;
    selecting, by the electronic apparatus in which the normal OS and the secure OS are installed, a first terminal from among the searched at least one external terminal in which a secure OS is installed;
    performing communication between the electronic apparatus, in which the normal OS and the secure OS are installed, and the first terminal in which the normal OS and the secure OS are installed in response to the first terminal being selected;
    searching, by the electronic apparatus in which the normal OS and the secure OS are installed, for at least one external terminal in which a normal OS is installed, from among at least one external terminal that is capable of being connected to the first terminal;
    selecting, by the electronic apparatus in which the normal OS and the secure OS are installed, a second terminal, from among the searched at least one external terminal, in which the normal OS is installed and the secure OS is not installed, wherein the second terminal is capable of being connected to the first terminal; and
    performing communication between the electronic apparatus and the second terminal in which the normal OS is installed and the secure OS is not installed, through the first terminal in which the normal OS and the secure OS are installed.

2. The method as claimed in claim 1, further comprising grouping the at least one terminal in which the normal OS is installed, based on user selection.

3. The method as claimed in claim 1, wherein:
    the searching for the at least one terminal in which the normal OS is installed comprises:
    receiving information about at least one terminal in which the secure OS is not installed, from the first terminal;

displaying a UI based on information about the at least one terminal in which the normal OS is installed; and wherein the performing communication between the electronic apparatus and the second terminal comprises performing communication with the second terminal selected by a user among electronic apparatuses included in the UI.

4. The method as claimed in claim 1, further comprising:
after communication between the electronic apparatus and the first terminal is performed, generating a first key value in the secure OS, transmitting the first key value to the first terminal, and receiving a second key value from the first terminal; and
maintaining communication with the first terminal using the first key value and the second key value.

5. The method as claimed in claim 4, further comprising:
blocking communication between the electronic apparatus and the first terminal when at least one of the first key value and the second key value is not present.

6. The method as claimed in claim 4, wherein the first key value and the second key value are updated at a preset period.

7. The method as claimed in claim 4, further comprising:
generating a control command using the second key value in the secure OS in response to a user command for performing an Internet of things (IoT) service being input, and transmitting the control command generated based on the second key value to the first terminal,
wherein the first terminal decodes the generated control command based on the second key value in the secure OS and performs the IoT service.

8. The method as claimed in claim 1, further comprising, after communication connection between the electronic apparatus and the second terminal is performed, generating a third key value in the secure OS and transmitting the third key value to the second terminal,
wherein, in response to a control command being received from the electronic apparatus to perform an IoT service, the second terminal authenticates the electronic apparatus using the third key value.

9. The method as claimed in claim 3, further comprising, in response to a third terminal being selected from the at least one terminal in which the normal OS included in the UI is installed, displaying a control menu for controlling the third terminal.

10. An electronic apparatus comprising:
communication circuitry configured to communicate with an external terminal; and
a processor configured to drive one of a normal operating system (OS) and a secure OS to perform an operation of the electronic apparatus, the electronic apparatus including both the normal OS and the secure OS;
wherein the processor of the electronic apparatus is configured to:
search for at least one external terminal in which a secure OS is installed;
select a first terminal, from among the searched at least one external terminal, in which the secure OS and the normal OS are installed;
control the communication circuitry to perform communication between the electronic apparatus and the first terminal;
search for at least one terminal in which the normal OS is installed, from among at least one external terminal that is capable of being connected to the first terminal;
select a second terminal, from the searched at least one terminal, in which the normal OS is installed but the secure OS is not installed, wherein the second terminal is capable of being connected to the first terminal; and
control the communication circuitry to perform communication between the electronic apparatus and the selected second terminal in which the normal OS is installed and the secure OS is not installed, through the first terminal in which both the normal OS and the secure OS are installed.

11. The electronic apparatus as claimed in claim 10, wherein the processor is configured to group the at least one terminal in which the normal OS is installed, based on a user selection.

12. The electronic apparatus as claimed in claim 10, further comprising a display,
wherein the processor is configured to control the communication circuitry to receive information about at least one terminal in which the secure OS is not installed, from the first terminal, to control the display to display a UI based on information about the at least one terminal in which the normal OS is installed, and to control the communication circuitry to perform communication with the second terminal selected by a user among electronic apparatuses included in the UI.

13. The electronic apparatus as claimed in claim 10, wherein the processor is configured to generate a first key value in the secure OS and to control the communication circuitry to transmit the first key value to the first terminal, and to receive a second key value from the first terminal, after communication with the first terminal is performed, and said processor is configured to control the communication circuitry to maintain communication with the first terminal using the first key value and the second key value.

14. The electronic apparatus as claimed in claim 13, wherein, when at least one of the first key value and the second key value is not present, the processor is configured to control the communication circuitry to block communication with the first terminal.

15. The electronic apparatus as claimed in claim 13, wherein the first key value and the second key value are updated at a preset period.

16. The electronic apparatus as claimed in claim 13, wherein:
in response to a user command for performing an Internet of things (IoT) service being input, the processor is configured to generate a control command using the second key value in the secure OS and to control the communication circuitry to transmit the control command generated based on the second key value to the first terminal; and
the first terminal is configured to decode the generated control command based on the second key value in the secure OS and to perform the IoT service.

17. The electronic apparatus as claimed in claim 10, wherein:
after communication connection with the second terminal is performed, the processor is configured to generate a third key value in the secure OS, and to control the communication circuitry to transmit the third key value to the second terminal; and
in response to a control command being received from the electronic apparatus to perform the IoT service, the second terminal is configured to authenticate the electronic apparatus using the third key value.

18. The electronic apparatus as claimed in claim 12, wherein, in response to a third terminal being selected from the at least one terminal in which the normal OS included in the UI, the processor is configured to control the display to display a control menu for controlling the third terminal.

19. A computer readable non-transitory recording medium having recorded thereon a program for executing a method for controlling an electronic apparatus in which a normal operating system (OS) and a different secure OS are installed, the method comprising:

searching, by the electronic apparatus which includes the normal OS and the secure OS, for at least one external terminal in which a secure OS is installed;

selecting, by the electronic apparatus which includes the normal OS and the secure OS, a first terminal, from among the searched at least one external terminal, in which the secure OS and the normal OS are installed;

performing communication between the electronic apparatus and the first terminal in response to a first terminal being selected from the retrieved at least one external terminal;

searching, by the electronic apparatus which includes the normal OS and the secure OS, for at least one terminal in which a normal OS is installed, from among at least one external terminal that is capable of being connected to the first terminal;

selecting, by the electronic apparatus which includes the normal OS and the secure OS, a second terminal, from the searched at least one terminal, in which the normal OS is installed but the secure OS is not installed, wherein the second terminal is capable of being connected to the first terminal; and performing communication between the electronic apparatus and the selected second terminal in which the normal OS is installed and the secure OS is not installed, through the first terminal in which both the normal OS and the secure OS are installed.

\* \* \* \* \*